US012585655B1

(12) United States Patent
    Nucci et al.

(10) Patent No.: US 12,585,655 B1
(45) Date of Patent: Mar. 24, 2026

(54) SYSTEM AND METHOD FOR AI-POWERED AUTONOMOUS RESOLUTION OF USER REQUESTS VIA DYNAMIC EXECUTION OF ACTION WORKFLOWS ACROSS MULTIPLE ENTERPRISE SYSTEMS

(71) Applicant: Automation Anywhere, Inc., San Jose, CA (US)

(72) Inventors: Antonio Nucci, San Jose, CA (US); Muddu Sudhakar, Saratoga, CA (US); Christos Tryfonas, Foster City, CA (US); Purushottam Amradkar, Sammamish, WA (US)

(73) Assignee: AUTOMATION ANYWHERE INC., San Jose, CA (US)

( * ) Notice: Subject to any disclaimer, the term of this patent is extended or adjusted under 35 U.S.C. 154(b) by 0 days.

(21) Appl. No.: 19/073,828

(22) Filed: Mar. 7, 2025

Related U.S. Application Data

(60) Provisional application No. 63/564,929, filed on Mar. 13, 2024.

(51) Int. Cl.
    *G06F 16/00*     (2019.01)
    *G06F 16/2453*   (2019.01)
    *G06F 16/2455*   (2019.01)
    *G06F 40/205*    (2020.01)

(52) U.S. Cl.
    CPC .. *G06F 16/24553* (2019.01); *G06F 16/24542* (2019.01); *G06F 40/205* (2020.01)

(58) Field of Classification Search
    CPC ..................... G06F 16/24553; G06F 16/24542
    USPC ......................................................... 707/769
    See application file for complete search history.

(56) References Cited

U.S. PATENT DOCUMENTS

| | | | |
|---|---|---|---|
| 11,368,423 B1 | 6/2022 | Plater-Zyberk et al. | |
| 11,657,094 B2 | 5/2023 | Moon et al. | |
| 11,900,928 B2 | 2/2024 | McKenzie et al. | |
| 11,960,514 B1 | 4/2024 | Taylert et al. | |
| 12,222,992 B1 | 2/2025 | Cetoli et al. | |
| 12,254,272 B1 | 3/2025 | Cetoli et al. | |
| 12,406,008 B1 | 9/2025 | Cetoli et al. | |
| 2010/0153216 A1 | 6/2010 | Liang et al. | |
| 2011/0258049 A1 | 10/2011 | Ramer et al. | |

(Continued)

OTHER PUBLICATIONS

AISERA: Agentic AI Copilot for the Enterprise provides Generative Artificial Intelligence Solutions, Feb. 2017; [retrieved on Nov. 2, 2024]. Available at URL:https://aisera.com/ pp. 1-19.

*Primary Examiner* — Chelcie L Daye
(74) *Attorney, Agent, or Firm* — Jason A. Smith; Shumaker, Loop & Kendrick, LLP

(57)                    ABSTRACT
Described herein are methods and systems for optimizing the retrieval of data from multiple different destination software applications or systems comprising a planner module, a navigator module, an executor module, and a response generator module, which together divide natural language queries of users into manageable sub-tasks using a large language learning model (LLM), convert sub-tasks into computer executable sub-tasks involving LLM-generated code, extract relevant data from destination software systems, and return a natural language result to the user utilizing an LLM. The methods and systems also include internal verifications and user feedback-implemented output modifications.

36 Claims, 11 Drawing Sheets

(56) References Cited

U.S. PATENT DOCUMENTS

| | | |
|---|---|---|
| 2014/0310595 A1 | 10/2014 | Acharya et al. |
| 2019/0042988 A1 | 2/2019 | Brown et al. |
| 2019/0237068 A1 | 8/2019 | Canim et al. |
| 2022/0121455 A1 | 4/2022 | Hoban et al. |
| 2022/0319503 A1 | 10/2022 | Das et al. |
| 2023/0117113 A1 | 4/2023 | Rubens |
| 2024/0289863 A1 | 8/2024 | Smith Lewis et al. |
| 2024/0356873 A1 | 10/2024 | Brewer et al. |
| 2024/0386436 A1 | 11/2024 | Ghoche et al. |
| 2025/0028941 A1 | 1/2025 | Krueger et al. |
| 2025/0094464 A1 | 3/2025 | Zhong et al. |
| 2025/0095638 A1 | 3/2025 | Cho et al. |
| 2025/0165467 A1* | 5/2025 | Zhang ............... G06F 16/24532 |

* cited by examiner

Table Name: Course (1001)

| Course_ID | Course_Name(1002) |
|-----------|-------------------|
| TC1297 | Communication Training |
| TC5413 | Department Orientation Training |
| TC3245 | Diversity & Inclusion Training |
| TC5163 | Emergency Services Training |
| TC3371 | Employee Wellness Training |
| TC9130 | Ethics Training |
| TC2776 | Disaster & Evacuation Training |
| TC1729 | New Employee Orientation Training |
| TC9823 | Workspace Safety Training |
| TC8734 | Workspace Violence Awareness Training |
| TC7656 | Hazardous Substances Training |
| TC9023 | Security Training |
| TC2730 | Talent Development Training |
| TC6661 | Management Training |
| TC7670 | Leadership Training |
| TC6331 | Probation Training |

(1003)

Table Name: Attendance (1004)

| Employee_ID | Course_ID | Attendance | Year | (1005) |
|-------------|-----------|------------|------|--------|
| 12653214 | TC1297 | Yes | 2023 |
| 12653214 | TC5413 | Yes | 2023 |
| 12653214 | TC3245 | Yes | 2023 |
| 12653214 | TC5163 | No | 2023 |
| 12653214 | TC3371 | Yes | 2023 |
| 12653214 | TC9130 | No | 2023 |
| 12653214 | TC2776 | No | 2023 |
| 12653214 | TC1729 | No | 2023 |
| 12653214 | TC9823 | No | 2023 |
| 12653214 | TC7656 | No | 2023 |
| 12653214 | TC9023 | No | 2023 |
| 12653214 | TC6661 | No | 2023 |
| 12653214 | TC7670 | No | 2023 |
| 12653214 | TC6331 | No | 2023 |

SYSTEM AND METHOD FOR AI-POWERED AUTONOMOUS RESOLUTION OF USER REQUESTS VIA DYNAMIC EXECUTION OF ACTION WORKFLOWS ACROSS MULTIPLE ENTERPRISE SYSTEMS

CROSS-REFERENCE

This application claims the benefit of U.S. Provisional Application No. 63/564,929, filed Mar. 13, 2024, which is hereby incorporated by reference in its entirety herein for all purposes.

BACKGROUND

Users rely heavily on AI assistance for knowledge acquisition and requesting automation pertaining to destination software applications. Fulfilling these requests and troubleshooting user requests typically requires accumulating a disparate variety of information from an array of elaborate and interconnected enterprise systems. Manually navigating these databases to fetch relevant data becomes increasingly unviable in an enterprise context.

SUMMARY

Considering the unpredictable nature of user inquiries, which can stem from a multitude of areas at any given time, it is difficult to know beforehand which systems will be accessed, the order these systems should be queried, or the information specifically searched for. The sheer volume of potential requests could quickly overwhelm any attempts to build and execute these data retrieval workflows.

Retrieving a variety of necessary information pertaining to destination software applications often requires a significant time investment, but also calls into question the scalability and efficiency of manual operations underpinning this process. Implementing a mechanism that can identify the appropriate systems, discern the order of their usage, and extract the required information is a vast improvement for any enterprise aiming for a more effective and scalable operation.

Destination software applications and systems such as organization database systems, enterprise resource planning (ERP) systems, customer relationship management (CRM) systems, supply chain management (SCM) systems, human resource management (HRM) systems, financial management (FM) systems, project management (PM) systems, business intelligence (BI) systems, and electronic document management (EDM) systems are often disconnected from each other and from the user who queries these systems. Manually navigating these destination software applications and systems is a laborious and intricate process. System integration of these destination software applications and systems can improve enterprise operations, making them more efficient, accurate, and personalized to the user query.

Generative artificial intelligence (AI) is artificial intelligence capable of generating text, images, or other media, using generative models. Advances in transformer-based deep neural networks have enabled a number of generative AI systems notable for accepting natural language prompts as input. One such type of model, a large language model (LLM), is a deep learning algorithm that can recognize, summarize, translate, predict and generate text and other forms of content based on knowledge gained from massive datasets. LLMs cans improve enterprise operations, making them more efficient, accurate, and personalized.

In one aspect, disclosed herein are computer-implemented methods for optimizing the retrieval of data from multiple different destination software applications or systems, the computer-implemented methods comprising: applying a planner module to interpret a user's query by performing operations comprising: (a) receiving a user query input, and (b) decomposing the user query input into one or more sub-tasks, wherein each sub-task is associated with a specific system and an objective; applying a navigator module to generate a tailored approach for executing each of the one or more sub-tasks by performing operations comprising: (a) analyzing the one or more sub-tasks of the planner module and one or more system reference documents to identify one or more appropriate API's and/or generate one or more appropriate SQL codes; applying an executor module to execute one or more of the sub-tasks in the destination system by performing operations comprising: (a) applying a caller component to formulate appropriate caller parameters, and (b) applying a parser component to identify and extract the relevant information; and applying a response generator module to generate one or more optimized final user responses, wherein the optimized final user response is generated by compiling data retrieved from the executor module.

In some embodiments, applying the planner module to interpret the user's query further comprises determining an optimized sequence for completing each of the one or more sub-tasks. In some embodiments, applying the planner module to interpret the user's query further comprises determining one or more optimal systems for completing each of the one or more sub-tasks. In some embodiments, determining the one or more optimal systems for completing each of the one or more sub-tasks further comprises integrating object specifications from each of the destination software applications or systems. In some embodiments, applying the planner module to interpret the user's query further comprises generating recommendations for the planner module by analyzing one or more documents via a retrieval-augmented generation (RAG) component. In some embodiments, the RAG component interprets and indexes one or more object specification files of the one or more of the destination software applications or systems. In some embodiments, applying the planner module further comprises applying a large language learning model (LLM). In some embodiments, applying the planner module to decompose the user's query further comprises integrating a LLM Plan Designer component to define one or more sub-tasks. In some embodiments, the LLM Plan Designer component defines the one or more sub-tasks based on the recommendations provided by the RAG component. In some embodiments, determining the optimized sequence for completing each of the one or more sub-tasks further comprises ordering each sub-task in a Planner Queue component of the planner module.

In some embodiments, the computer-implemented method further comprises sending each of the one or more sub-tasks to the navigator module in order of which sub-task entered the Planner Queue component earliest. In some embodiments, applying the navigator module to generate the tailored approach further comprises translating each of the sub-tasks generated by the planner module into one or more system-focused sub-tasks. In some embodiments, translating each of the sub-tasks into the system-focused sub-tasks further comprises integrating task-specific objects, wherein the task-specific objects comprise one or more table schemas or one or more API request schemas. In some embodiments, analyzing the one or more sub-tasks of the planner module further comprises analyzing one or more of: a task description, an endpoint to be invoked, an invocation type, a method of invocation, and/or an endpoint object specification. In some embodiments, applying the navigator module to generate the tailored approach further comprises accessing the one or more destination software applications or systems using SQL, APIs, SDK, or cloud-based integration platforms, or any combination thereof. In some embodiments, applying the navigator module to generate the tailored approach further comprises applying an LLM. In some embodiments, identifying the one or more appropriate API's and/or generating one or more appropriate SQL codes further comprises modifying the APIs or SQL codes using the LLM. In some embodiments, applying the navigator module to generate the tailored approach further comprises returning a preliminary output for a first sub-task, wherein the navigator module utilizes the preliminary output for the first sub-task to generate the tailored approach for one or more subsequent sub-tasks.

In some embodiments, the computer-implemented method further comprises applying the navigator module to generate an expected output, wherein the expected output is provided to the executor module by the navigator module. In some embodiments, the expected output comprises one or more parameters from a response object of the caller component output. In some embodiments, applying the caller component of the executor module to execute the one or more sub-tasks further comprises formulating one or more optimized request bodies and/or one or more commands aligning with system specifications. In some embodiments, applying the parser component of the executor module to execute the one or more sub-tasks further comprises receiving information from a remote system. In some embodiments, identifying and extracting the relevant information further comprises identifying and extracting headers in AIP responses or tuples in SQL result sets. In some embodiments, the relevant information further comprises one or more SQL response objects, or one or more API response schema. In some embodiments, applying the response generator model to generate the one or more optimized final responses further comprises deriving the optimized response from the selected destination software applications. In some embodiments, applying the response generator model to generate the one or more optimized final responses further comprises applying a LLM. In some embodiments, generating one or more of the optimized final user responses via the response generator module further comprises processing the data retrieved from the executor module with the LLM to generate the optimized final user responses.

In some embodiments, the computer-implemented method further comprises initiating internal verification checkpoints to verify successful execution of each sub-task.

In some embodiments, the computer-implemented method further comprises collecting logs for each of the one or more sub-tasks for each of the modules.

In some embodiments, the computer-implemented method further comprises outputting a notification to the user that the sub-task cannot be executed.

In some embodiments, the computer-implemented method further comprises outputting a customized notification to the user comprising the name of the sub-task that cannot be executed.

In some embodiments, the computer-implemented method further comprises returning the executor module results to the planner module, and the planner module modifying the one or more sub-tasks based on the returned results.

In some embodiments, the computer-implemented method further comprises the planner module operating in an exhaustive modality or a clarification modality upon receiving multiple returned results from the executor module. In some embodiments, operating in the exhaustive modality further comprises applying the planner module to create a plan branch node for each returned result from the executor module, wherein the planner module clones each of the one or more remaining sub-tasks into each plan branch. In some embodiments, operating in the clarification modality further comprises applying the response module to output a clarifying query to the user, wherein upon additional clarifying user input, applying the planner module to select one of the plan branches, or eliminate one of the plan branches.

In another aspect, disclosed herein are computer-implemented methods for optimizing the retrieval of data from multiple destination software applications and/or systems, the method comprising: interpreting a user's query by performing operations comprising: receiving a user query input, and decomposing the user query input into one or more sub-tasks, wherein each sub-task is associated with a specific system and an objective; generating a tailored approach for executing each of the one or more sub-tasks by performing operations comprising: analyzing the one or more sub-tasks of the planner module and one or more system reference documents to identify one or more appropriate API's and/or generate one or more appropriate SQL codes; executing one or more of the sub-tasks in the destination system by performing operations comprising: applying a caller component to formulate appropriate caller parameters, and applying a parser component to identify and extract the relevant information; and generating one or more optimized final user responses, wherein the optimized final user response is generated by compiling data retrieved from the executor module.

In another aspect, disclosed herein are computer-implemented systems for optimizing the retrieval of data from multiple different destination software applications, the computer-implemented system comprising: a planner module configured to interpret a user's query by performing operations comprising: (a) receiving a user query input, and (b) decomposing the user query input into one or more sub-tasks, wherein each sub-task is associated with a specific system and an objective; a navigator module configured to generate a tailored approach for executing each of the one or more sub-tasks by performing operations comprising: (a) analyzing the one or more sub-tasks of the planner module and one or more system reference documents to identify one or more appropriate API's and/or generate one or more appropriate SQL codes; an executor module configured to execute one or more of the sub-tasks in the destination system by performing operations comprising: (a) formulating appropriate caller parameters via a caller component, and (b) identifying and extracting the relevant information via a parser component; and a response generator module configured to generate an optimized final user response, wherein the generator module generates the optimized final user response by compiling data retrieved from the executor module.

In some embodiments, the planner module is configured to perform operations further comprising determining an optimized sequence for completing each of the one or more sub-tasks. In some embodiments, the planner module is configured to perform operations further comprising determining one or more optimal systems for completing each of the one or more sub-tasks. In some embodiments, the planner module is configured to perform operations further comprising integrating object specifications from each of the destination software applications or systems. In some embodiments, the planner module further comprises a retrieval-augmented generation (RAG) component, wherein the RAG component is configured to perform operations comprising generating sub-task recommendations by analyzing one or more documents. In some embodiments, the RAG component interprets and indexes one or more object specification files of the one or more of the destination software applications or systems. In some embodiments, the planner module further comprises a language learning model (LLM). In some embodiments, the planner module further comprises a LLM Plan Designer component, wherein the LLM Plan Designer component is configured to perform operations comprising defining one or more sub-tasks. In some embodiments, the LLM Plan Designer component defines the one or more sub-tasks based on the recommendations provided by the RAG component. In some embodiments, the planner module further comprises a Planner Queue component, wherein the Planner Queue component is configured to perform operations comprising ordering each sub-task. In some embodiments, the planner module is configured to perform operations further comprising sending each of the one or more sub-tasks to the navigator module in a predetermined order, wherein the predetermined order comprises order of sub-task entry into the Planner Queue component. In some embodiments, the navigator module is configured to perform operations further comprising translating each of the sub-tasks generated by the planner module into one or more system-focused sub-tasks. In some embodiments, the navigator module is configured to perform operations further comprising integrating task-specific objects, wherein the task-specific objects comprise one or more table schemas or one or more API request schemas. In some embodiments, the navigator module is configured to perform operations further comprising analyzing one or more of the following pieces of information from the planner module: a task description, an endpoint to be invoked, an invocation type, a method of invocation, or an endpoint object specification, or any combination thereof. In some embodiments, the navigator module is configured to perform operations further comprising accessing the one or more destination software applications or systems using SQL, APIs, SDK, and/or cloud-based integration platforms.

In some embodiments, the navigator module further comprises an LLM. In some embodiments, the navigator module is configured to perform operations further comprising modifying the APIs or SQL codes using the LLM. In some embodiments, the navigator module is configured to perform operations further comprising returning a preliminary output for a first sub-task, wherein the navigator module utilizes the preliminary output for the first sub-task to generate the tailored approach for one or more subsequent sub-tasks. In some embodiments, the navigator module is configured to perform operations further comprising generating an expected output, wherein the navigator module provides the expected output to the executor module. In some embodiments, the expected output of the navigator module further comprises one or more parameters from a response object of the caller component output. In some embodiments, the caller component of the executor module is configured to perform operations further comprising formulating one or more optimized request bodies and/or one or more commands aligning with system specifications. In some embodiments, the parser component of the executor module is configured to perform operations further comprising receiving information from a remote system. In some embodiments, the executor module is configured to perform operations further comprising identifying and extracting headers in AIP responses or tuples in SQL result sets. In some embodiments, the relevant information of the executor module further comprises one or more SQL response objects, or one or more API response schema. In some embodiments, the response generator module is configured to perform operations further comprising deriving the one or more optimized responses from the selected destination software applications. In some embodiments, the response generator module further comprises an LLM. In some embodiments, the one or more optimized responses comprise modified responses generated by the response generator module in combination with the LLM.

In some embodiments, the system further comprises one or more algorithms iteratively applied to perform internal verifications at one or more checkpoints to verify successful execution of each sub-task.

In some embodiments, the system further comprises one or more algorithms iteratively applied to collect logs for each of the one or more sub-tasks at each of the modules. In some embodiments, the response generator is configured to perform operations further comprising outputting a notification to the user that the sub-task cannot be executed. In some embodiments, the response generator is configured to perform operations further comprising outputting a customized notification to the user comprising one or more pieces of information relevant to the sub-task that cannot be executed. In some embodiments, the executor module is configured to perform operations further comprising returning output results to the planner module, and the planner module configured to perform operations further comprising modifying the one or more sub-tasks based on the returned results. In some embodiments, the planner module further comprises an exhaustive modality of operation or a clarification modality of operation, wherein the planner module selects the modality of operation upon receiving multiple returned results from the executor module. In some embodiments, the planner module in the exhaustive modality of operation is configured to perform operations further comprising creating a plan branch node for each returned result from the executor module. In some embodiments, the planner module in the exhaustive modality of operation is configured to perform operations further comprising cloning the remaining sub-tasks into each of the plan branch nodes. In some embodiments, the planner module in the clarification modality of operation is configured to perform operations further comprising outputting a clarifying query to the user, wherein upon additional clarifying user input, the planner selects one of the plan branches, or eliminates one of the plan branches. In some embodiments, the executor module is configured to perform operations further comprising retrieving data from destination software applications or systems selected from the group comprising: enterprise resource planning systems, customer relationship management systems, organization data repositories, supply chain management systems, human resource management systems, financial management systems, project management systems, business intelligence systems, or electronic document management systems, or any combination thereof.

In some embodiments, the system further comprises a neural network.

In some embodiments, the system further comprises a deep neural network.

In yet another aspect, disclosed herein are one or more non-transitory computer-readable storage media encoded with instructions executable by one or more processors to provide an application comprising: a planner module configured to interpret a user's query by performing operations comprising: receiving a user query input, and decomposing the user query input into one or more sub-tasks, wherein each sub-task is associated with a specific system and an objective; a navigator module configured to generate a tailored approach for executing each of the one or more sub-tasks by performing operations comprising: analyzing the one or more sub-tasks of the planner module and one or more system reference documents to identify one or more appropriate API's and/or generate one or more appropriate SQL codes; an executor module configured to execute one or more of the sub-tasks in the destination system by performing operations comprising: formulating appropriate caller parameters via a caller component, and identifying and extracting the relevant information via a parser component; and a response generator module configured to generate an optimized final user response, wherein the generator module generates the optimized final user response by compiling data retrieved from the executor module.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIG. 10 shows a non-limiting example of a database table in a destination software application or system from which an API or SQL code can optimally retrieve appropriate data.

DETAILED DESCRIPTION

Figure 1:
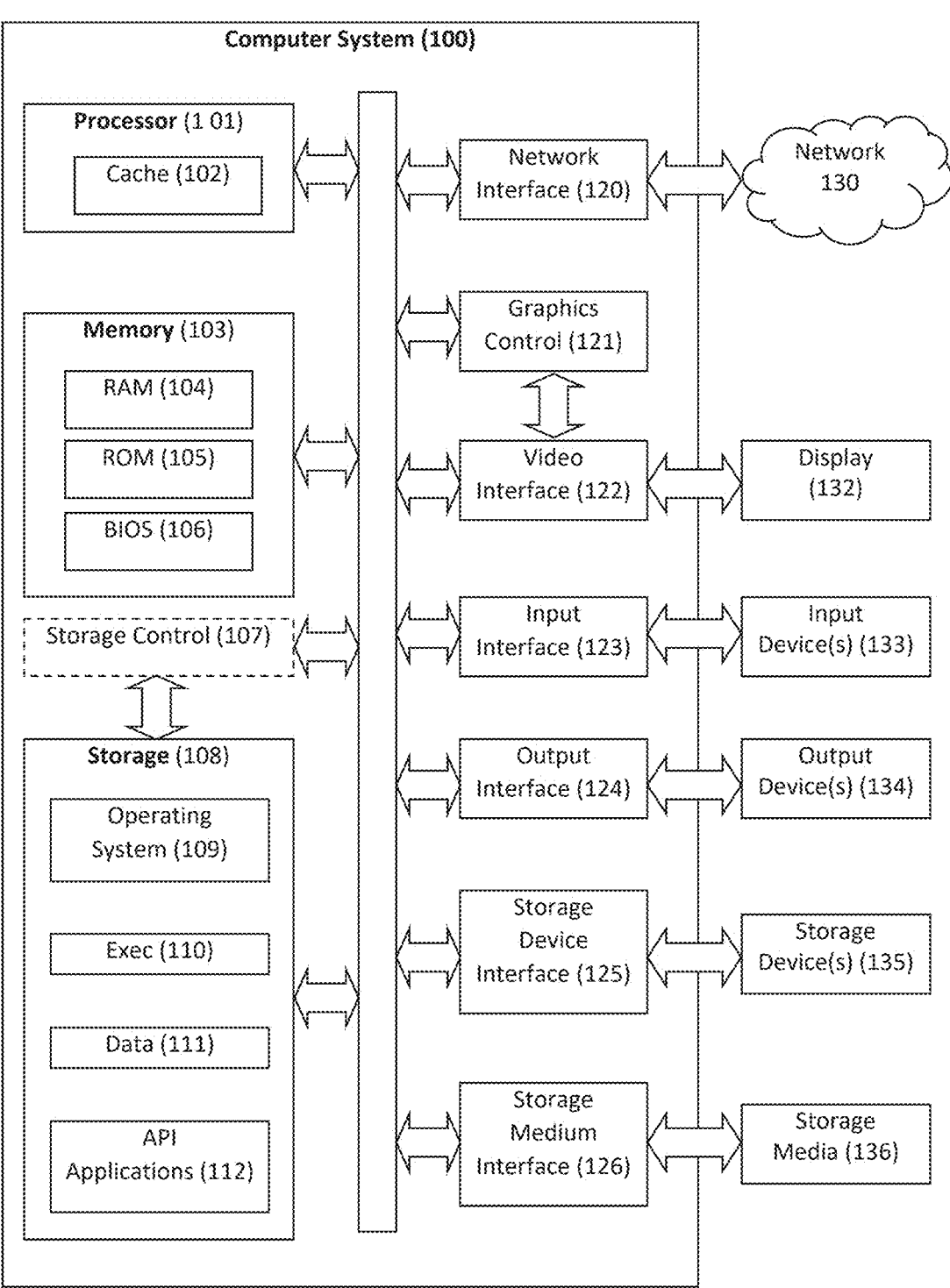
FIG. 1 shows a non-limiting example of a computing device; in this case, a device with one or more processors, memory, storage, and a network interface, per one or more embodiments herein.

Described herein, in certain embodiments, are computer-implemented methods for optimizing the retrieval of data from multiple different destination software applications or systems, the computer-implemented method can comprise: applying a planner module, which can interpret a user's query by performing operations which can comprise: (a) receiving a user query input, and (b) decomposing the user query input into one or more sub-tasks, wherein each sub-task can be associated with a specific system and can be associated with an objective; applying a navigator module, which can generate a tailored approach for executing each of the one or more sub-tasks by performing operations which can comprise: analyzing the one or more sub-tasks of the planner module and one or more system reference documents to identify one or more appropriate API's and/or generate one or more appropriate SQL codes; applying an executor module which can execute one or more of the sub-tasks in the destination system by performing operations which can comprise: (a) applying a caller component which can formulate appropriate caller parameters, and (b) applying a parser component which can identify and extract the relevant information; and applying a response generator module which can generate one or more optimized final user responses, wherein the optimized final user response can be generated by compiling data retrieved from the executor module.

Also described herein, in certain embodiments, are one or more computer-implemented systems for optimizing the retrieval of data from multiple different destination software applications, the computer-implemented systems can comprise: a planner module which can be configured to interpret a user's query by performing operations which can comprise: (a) receiving a user query input, and (b) decomposing the user query input into one or more sub-tasks, wherein each sub-task can be associated with a specific system and an objective; a navigator module which can be configured to generate a tailored approach for executing each of the one or more sub-tasks by performing operations comprising: analyzing the one or more sub-tasks of the planner module and one or more system reference documents to identify one or more appropriate API's and/or generate one or more appropriate SQL codes; an executor module which can be configured to execute one or more of the sub-tasks in the destination system by performing operations comprising: (a) formulating appropriate caller parameters via a caller component, and (b) identifying and extracting the relevant information via a parser component; and a response generator module which can be configured to generate an optimized final user response, wherein the generator module can generate the optimized final user response by compiling data retrieved from the executor module.

Terms and Definitions

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" in some cases refers to an amount that is approximately the stated amount, in some cases near the stated amount by 10%, 5%, or 1%, including increments therein, and in some cases, in reference to a percentage, refers to an amount that is greater or less the stated percentage by 10%, 5%, or 1%, including increments therein.

As used herein, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C", "one or more of A, B, or C" and "A, B, and/or C" means A alone, B alone, C alone, A and B together, A and C together, B and C together, or A, B and C together.

Reference throughout this specification to "some embodiments," "further embodiments," or "a particular embodiment," means that a particular feature, structure, or characteristic described in connection with the embodiment is included in at least one embodiment. Thus, the appearances of the phrase "in some embodiments," or "in further embodiments," or "in a particular embodiment" in various places throughout this specification are not necessarily all referring to the same embodiment. Furthermore, the particular features, structures, or characteristics may be combined in any suitable manner in one or more embodiments.

Computing Systems

Referring to FIG. 1, a block diagram is shown depicting an exemplary machine that includes a computer system 100 (e.g., a processing or computing system) within which a set of instructions can execute for causing a device to perform or execute any one or more of the aspects and/or methodologies for static code scheduling of the present disclosure. The components in FIG. 1 are examples only and do not limit the scope of use or functionality of any hardware, software, embedded logic component, or a combination of two or more such components implementing particular embodiments.

Computer system 100 may include one or more processors 101, a memory 103, and a storage 108 that communicate with each other, and with other components, via a bus 140. The bus 140 may also link a display 132, one or more input devices 133 (which may, for example, include a keypad, a keyboard, a mouse, a stylus, etc.), one or more output devices 134, one or more storage devices 135, and various tangible storage media 136. All of these elements may interface directly or via one or more interfaces or adaptors to the bus 140. For instance, the various tangible storage media 136 can interface with the bus 140 via storage medium interface 126. Computer system 100 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 100 includes one or more processor(s) 101 (e.g., central processing units (CPUs) or general purpose graphics processing units (GPGPUs)) that carry out functions. Processor(s) 101 optionally contains a cache memory unit 102 for temporary local storage of instructions, data, or computer addresses. Processor(s) 101 are configured to assist in execution of computer readable instructions. Computer system 100 may provide functionality for the components depicted in FIG. 1 as a result of the processor(s) 101 executing non-transitory, processor-executable instructions embodied in one or more tangible computer-readable storage media, such as memory 103, storage 108, storage devices 135, and/or storage medium 136. The computer-readable media may store software that implements particular embodiments, and processor(s) 101 may execute the software. Memory 103 may read the software from one or more other computer-readable media (such as mass storage device(s) 135, 136) or from one or more other sources through a suitable interface, such as network interface 120. The software may cause processor(s) 101 to carry out one or more processes or one or more steps of one or more processes described or illustrated herein. Carrying out such processes or steps may include defining data structures stored in memory 103 and modifying the data structures as directed by the software.

The memory 103 may include various components (e.g., machine readable media) including, but not limited to, a random access memory component (e.g., RAM 104) (e.g., static RAM (SRAM), dynamic RAM (DRAM), ferroelectric random access memory (FRAM), phase-change random access memory (PRAM), etc.), a read-only memory component (e.g., ROM 105), and any combinations thereof. ROM 105 may act to communicate data and instructions unidirectionally to processor(s) 101, and RAM 104 may act to communicate data and instructions bidirectionally with processor(s) 101. ROM 105 and RAM 104 may include any suitable tangible computer-readable media described below. In one example, a basic input/output system 106 (BIOS), including basic routines that help to transfer information between elements within computer system 100, such as during start-up, may be stored in the memory 103.

Fixed storage 108 is connected bidirectionally to processor(s) 101, optionally through storage control unit 107. Fixed storage 108 provides additional data storage capacity and may also include any suitable tangible computer-readable media described herein. Storage 108 may be used to store operating system 109, executable(s) 110, data 111, applications 112 (application programs), and the like. Storage 108 can also include an optical disk drive, a solid-state memory device (e.g., flash-based systems), or a combination of any of the above. Information in storage 108 may, in appropriate cases, be incorporated as virtual memory in memory 103.

In one example, storage device(s) 135 may be removably interfaced with computer system 100 (e.g., via an external port connector (not shown)) via a storage device interface 125. Particularly, storage device(s) 135 and an associated machine-readable medium may provide non-volatile and/or volatile storage of machine-readable instructions, data structures, program modules, and/or other data for the computer system 100. In one example, software may reside, completely or partially, within a machine-readable medium on storage device(s) 135. In another example, software may reside, completely or partially, within processor(s) 101.

Bus 140 connects a wide variety of subsystems. Herein, reference to a bus may encompass one or more digital signal lines serving a common function, where appropriate. Bus 140 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 100 may also include an input device 133. In one example, a user of computer system 100 may enter commands and/or other information into computer system 100 via input device(s) 133. Examples of an input device(s) 133 include, but are not limited to, an alphanumeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 133 may be interfaced to bus 140 via any of a variety of input interfaces 123 (e.g., input interface 123) including, but not limited to, serial, parallel, game port, USB, FIREWIRE, THUNDERBOLT, or any combination of the above.

In particular embodiments, when computer system 100 is connected to network 130, computer system 100 may communicate with other devices, specifically mobile devices and enterprise systems, distributed computing systems, cloud storage systems, cloud computing systems, and the like, connected to network 130. Communications to and from computer system 100 may be sent through network interface 120. For example, network interface 120 may receive incoming communications (such as requests or responses from other devices) in the form of one or more packets (such as Internet Protocol (IP) packets) from network 130, and computer system 100 may store the incoming communications in memory 103 for processing. Computer system 100 may similarly store outgoing communications (such as requests or responses to other devices) in the form of one or more packets in memory 103 and communicated to network 130 from network interface 120. Processor(s) 101 may access these communication packets stored in memory 103 for processing.

Examples of the network interface 120 include, but are not limited to, a network interface card, a modem, and any combination thereof. Examples of a network 130 or network segment 130 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 130, may employ a wired and/or a wireless mode of communication. In general, any network topology may be used.

Information and data can be displayed through a display 132. Examples of a display 132 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMO-LED) display, a plasma display, and any combinations thereof. The display 132 can interface to the processor(s) 101, memory 103, and fixed storage 108, as well as other devices, such as input device(s) 133, via the bus 140. The display 132 is linked to the bus 140 via a video interface 122, and transport of data between the display 132 and the bus 140 can be controlled via the graphics control 121. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 132, computer system 100 may include one or more other peripheral output devices 134 including, but not limited to, an audio speaker, a printer, a storage device, and any combinations thereof. Such peripheral output devices may be connected to the bus 140 via an output interface 124. Examples of an output interface 124 include, but are not limited to, a serial port, a parallel connection, a USB port, a FIREWIRE port, a THUNDER-BOLT port, and any combinations thereof.

In addition or as an alternative, computer system 100 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, cloud computing platforms, distributed computing platforms, server clusters, server computers, desktop computers, laptop computers, notebook computers, sub-notebook computers, netbook computers, and netpad computers.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research in Motion® BlackBerry OS®, Google® Android®, Microsoft® Windows Phone® OS, Microsoft® Windows Mobile® OS, Linux®, and Palm® WebOS®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Programs

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, which perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, a distributed computing resource, a cloud computing resource, or combinations thereof. In further various embodiments, a software module comprises a plurality of files, a plurality of sections of code, a plurality of programming objects, a plurality of programming structures, a plurality of distributed computing resources, a plurality of cloud computing resources, or combinations thereof. In various embodiments, the one or more software modules comprise, by way of non-limiting examples, a web application, a mobile application, a standalone application, and a distributed or cloud computing application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of information, for example customer incident data. In various embodiments, suitable databases include, by way of non-limiting examples, relational databases, non-relational databases, object oriented databases, object databases, entity-relationship model databases, associative databases, XML databases, document oriented databases, and graph databases. Further non-limiting examples include SQL, PostgreSQL, MySQL, Oracle, DB2, Sybase, and MongoDB. In some embodiments, a database is Internet-based. In further embodiments, a database is web-based. In still further embodiments, a database is cloud computing-based. In a particular embodiment, a database is a distributed database.

In other embodiments, a database is based on one or more local computer storage devices.

LLM Technology Stack

Figure 2:
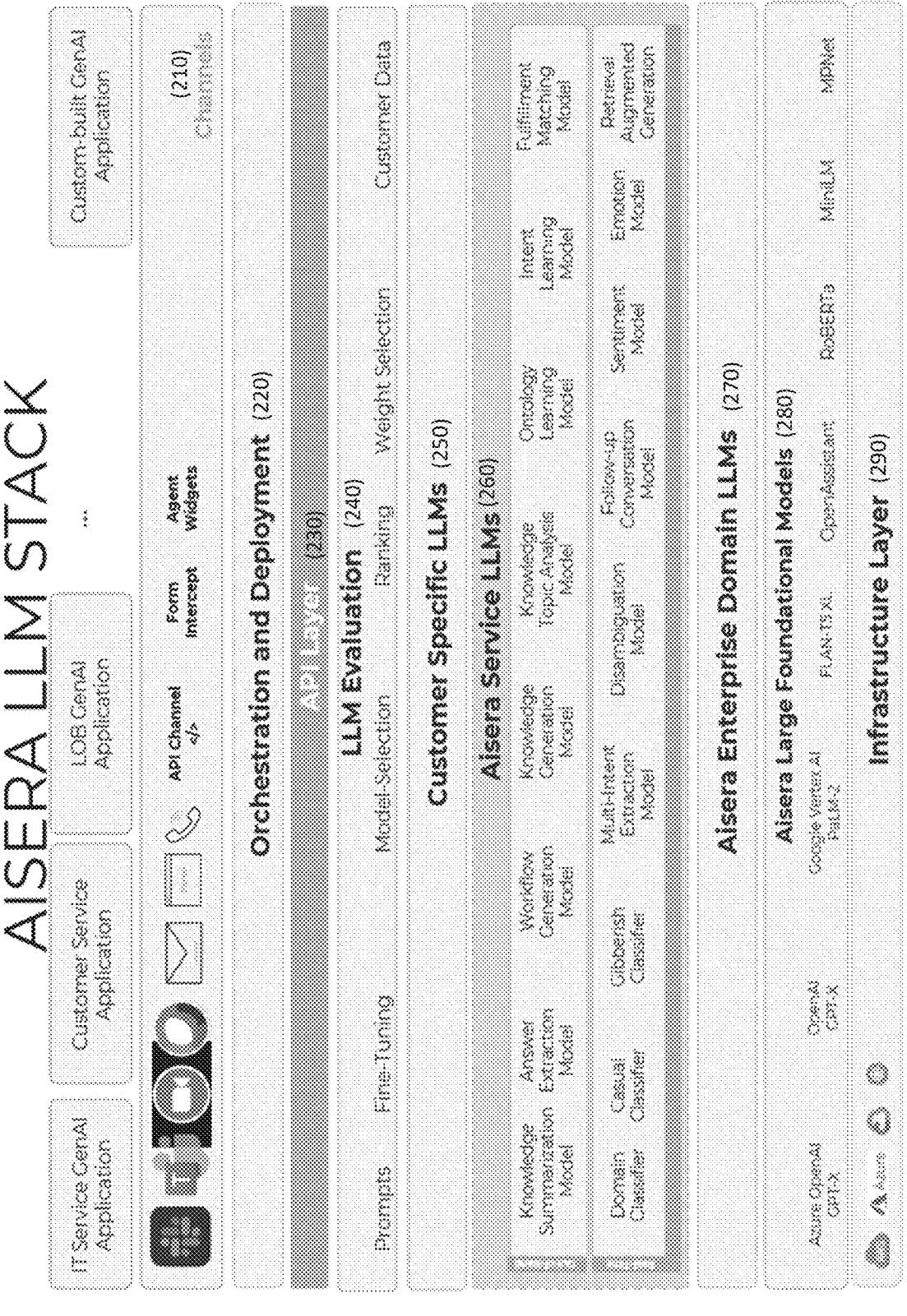
FIG. 2 shows a first diagram of an exemplary technology stack, per one or more embodiments herein.
Figure 3:
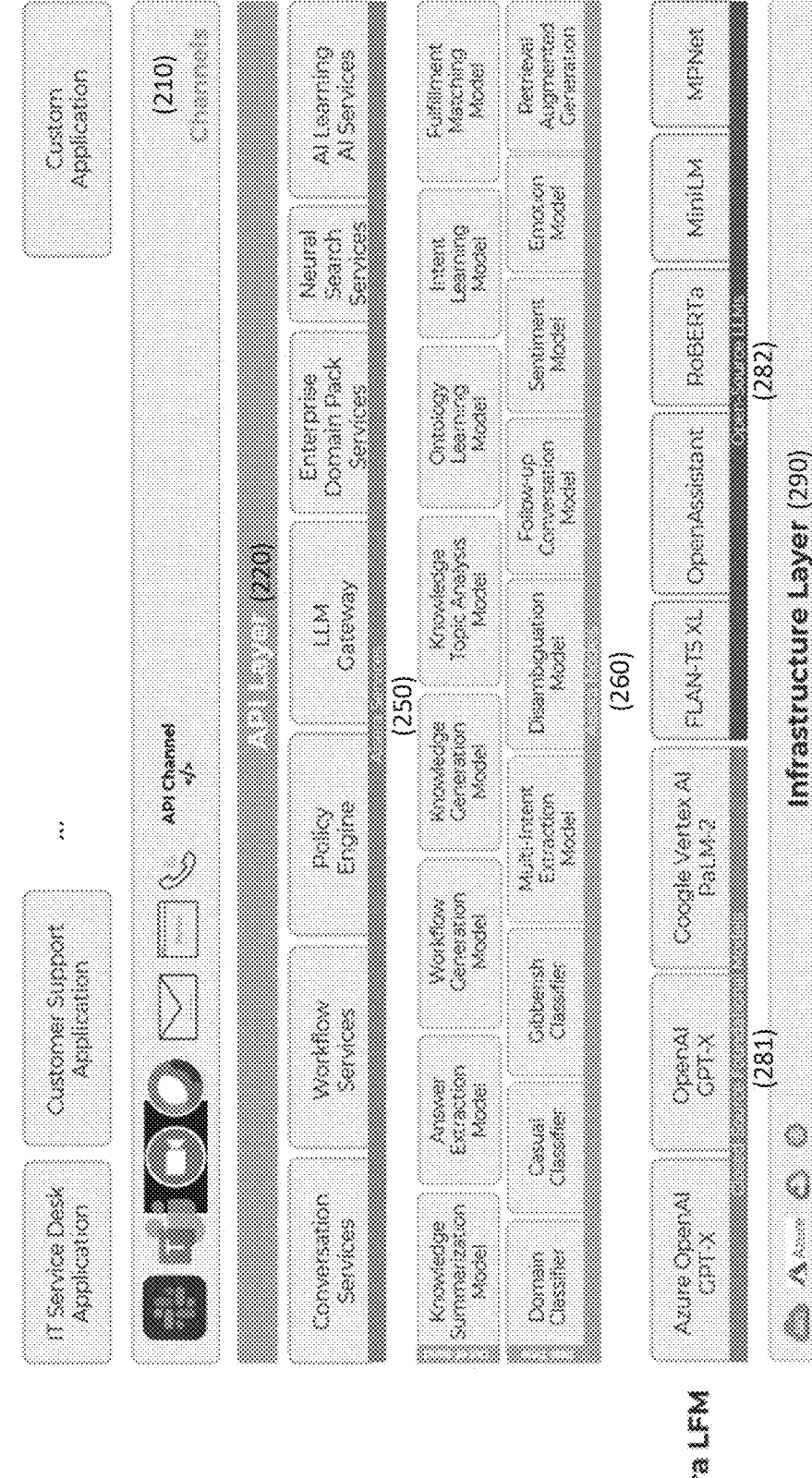
FIG. 3 shows a second diagram of an exemplary technology stack; in this case, a technology stack with large language model (LLM) emphasis.

FIGS. 2 and 3 show diagrams of an exemplary Large Language Model (LLM) Technology Stack. In some embodiments, the LLM stack herein can be deployed, scaled and operated both in public clouds (AWS, GCP, Azure, etc.) on an Infrastructure Layer 290 and locally (on-premises) using the Kubernetes container orchestration platform.

In some embodiments, the LLM stack herein embeds a plurality of large foundational models (LFMs) 280, including both closed-source LFMs 281 via an API layer 230 integrated with LFMs, and open-source LFMs 282 via the LFM deployment and execution in secure Kubernetes containers. Non-limiting examples of closed-source LFM providers which are integrated with The LLM stack herein via APIs are Azure OpenAI (complete and chat APIs for GPT-3, GPT-3.5, and GPT-4), OpenAI (complete and chat APIs for GPT-3, GPT-3.5 and GPT-4), Google Vertex AI (PaLM-2). Non-limiting examples of open-source LFM are FLAN-T5, OpenAssistant, ROBERTa, MiniLM, and MPNet.

In some embodiments, the LLM stack herein enables a developer to choose from a pool of supported LFM/LLM models using a catalog, or to integrate a new LFM/LLM model using the LLM Gateway. In some embodiments, the LLM Gateway Toolkit allows the developer to select the LFM provider of choice, either from a catalog or by selecting "New LFM" (in which case he needs to provide the LFM Provider URL and the API Credentials to establish a successful connection), create a new LLM Group, which is a logical folder associated to the developer, and simply upload the new LLM models in the LLM group.

The LLM stack herein provides the developer with the flexibility of choosing both the LFM framework and a customer-specific LLM model 250 for any given task based on the different LLM services needed to operate a conversational AI assistant. As a result, in some embodiments, developers can develop end to end LLM workflows or LLM services 260 which comprise more than one task by choosing a specific LFM/LLM model for each specific task to be executed in the pipeline.

In some embodiments, developers can calibrate each model per their objectives to deliver a high level of precision and accuracy. In some embodiments, LLM stack herein allows the developer to calibrate the mode using the below behaviors:

Zero-shot Learning: The developer can use the pre-trained LLM model as-is. Examples of such tasks are language detection, language translation, sentiment detection, emotion detection, etc.

Few-shots Learning (e.g., prompt engineering or inference-time tuning): In some embodiments, the developer guides the model to the desired output by providing the LLM model with few examples and instructions. In some embodiments, this calibration model does not alter the underlying parameters of the LLM models.

Instruction-based Fine-Tuning: This method may provide a higher level of precision and accuracy than zero-shot or few-shot learnings. In some embodiments, in this method, the developer trains the model using specialized datasets, which are high-quality human-generated prompt/response pairs specifically designed for instruction tuning LLMs. In some embodiments, this method of calibration acts deeper in the LLM model by updating the internal parameters used by the model. The model fine-tuning is the most advanced calibration method and may require both computing resources for training and supervised, high-quality and extensive datasets to generate the prompt/response sentence pairs for training.

In some embodiments, the Large Language Model (LLM) technology stack herein can operate in multiple industry verticals (e.g., logistics, healthcare, wealth management, retailers, banking, airlines, and insurance) and enterprise domains 270 (e.g., IT, HR, legal and compliance, finance, supply chain management, facilities). The Enterprise Domain LLMs are LLM models which have been extensively fine-tuned using prompt/response sentence pairs extracted from Enterprise Domain Packs (EDPs). In some embodiments, each Enterprise Domain Pack comprises a domain-specific ontology, which is an extensive set of entity classes, entity names, entity synonymous like entity expansions, and abbreviations (initialisms, acronymous, shortenings and contractions) and domain-specific taxonomy, which is an extensive set of intents (and intent phrases) associated to each entity of the ontology. Each domain EDP may comprise hundreds of thousands to millions of intent phrases.

In some embodiments, the Large Language Model (LLM) technology stacks herein use pre-packaged and fine-tuned a large pool of domain-specific LLM Services 260 using one or more EDPs. The LLM Services 260 may be available to developers in a Service LLM catalog. In some embodiments, the developer uses the LLM Services 260 via an API or can select or drag/drop/chain them into a conversational workflow using a studio to build complete experiences around a service.

In some embodiments, the LLM stack herein provides a further level of LLM model customization beyond the calibration offered via the instruction-fine tuning and EDP. The Large Language Model (LLM) technology stack herein offers special learning pipelines, which act on the specific customer datasets (e.g., tickets, knowledge articles, call transcripts, etc.) which may automatically extract entities and intents which are very specific to the customer (e.g., within the domain of operation). In some embodiments, this custom-specific knowledge is then used to generate custom-specific prompt/responses which may then be used to execute a second round of instruction-based fine tuning on a proprietary Enterprise Domain LLMs, which may be fine-tuned using only the domain-specific EDPs. Exemplary proprietary AI Learning pipelines directly linked to instruction-based fine-tuning pf LLM models are listed below:

Tickets Learning Pipeline: Iteratively and continuously processes tickets and automatically extracts the main entities and associated intents. By grouping tickets tagged with the same pair of intents and entities, the pipeline may automatically generate intent phrases capturing the language diversity used by the specific customer to express the same concept.

Conversation Learning Pipeline: Iteratively and continuously processes user requests and calls transcripts, and automatically extracts the main entities and associated intents. By grouping conversations tagged with the same pair of intent and entity, the pipeline may automatically generate intent phrases capturing the language diversity used by the specific customer to express the same concept.

Knowledge Learning Pipeline: Processes ingested customer knowledge articles and may automatically extract the main entities, associated intents and large set of intent phrases from each article.

Ontology Generation: Consumes all the entity-based learning from the different pipelines, may automatically discover expansions, abbreviations, and relationships among the entities, and organizes all the entities into an ontology graph which may be made available as a catalog.

Taxonomy Generation: Consumes all the intent-based learning from the different pipelines and may automatically organize all semantic similar intents into a multi-category multi-level intent taxonomy which is made available as a catalog.

In some embodiments, the LLM stack herein provides an LLM evaluation level 240, which the user with a set of toolkits and APIs that developers can use to evaluate the performance of the LLM models herein. Developers can access toolkits and APIs for development, testing and benchmarking the following: prompt engineering (e.g., few shots learning), fine tuning, Model Selection via LLM catalog and LLM Gateway, model performance ranking which automatically scores the models against the same dataset to automatically stack rank LFM/LLM models based on the accuracy achieved, and manage customer datasets for instruction-fine tuning models.

In some embodiments, the LLM stack herein offers a comprehensive Orchestration and Deployment Layer 220 that is used to allocate and deploy resources (including servers, virtual machines, networking, security and storage), monitor software lifecycle operations, and recover from error conditions. In some embodiments, the LLM stack herein offers a large diversity of channels 210 to interface with users like Slack, Microsoft Teams, Cisco WebEx, Zoom, SMS/MMS, Email and Voice), Administrator Portal, Form Intercept and Agent Widgets.

In some embodiments, prompts can have a separate LLM Provider, internal or external (e.g., OpenAI, Bard, etc.). Input Variables can be passed into prompts (e.g. Chat history). In some embodiments, prompt groups and/or prompt chaining is implemented as well.

Figure 4:
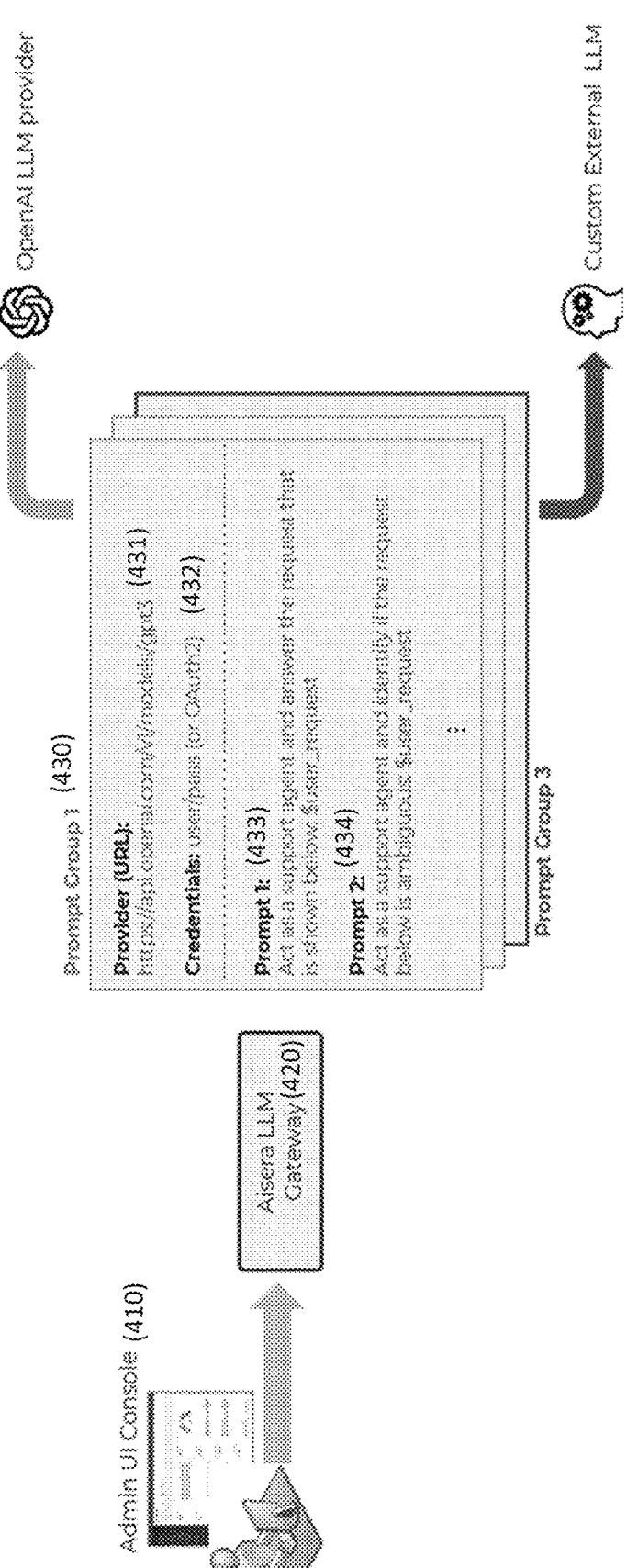
FIG. 4 shows a diagram of an exemplary method of prompt registration configured at an admin console through an LLM gateway, per one or more embodiments herein.

In some embodiments, per FIG. 4, an LLM provider is registered through a LLM Gateway by an Admin UI console 410. In some embodiments, prompts are added that will be used mainly for preconfigured Tasks through the LLM Gateway 420 (e.g., an Admin UI console). In some embodiments, calling the registered prompts can be performed by using a prompt for the main NLU path by inserting them inside the Pre-Handling Flow, or as an auxiliary capacity, by adding prompts inside a flow (e.g., using the new LLM action). In the example shown, a first prompt group 430 comprises a provider URL 431 and the associated credentials 432, a first prompt 433, and a second prompt 434. As shown, the first prompt 433 and the second prompt 434 of the first prompt group 430 are sent to an OpenAI LLM provider 450. Further, a second prompt group 440 is sent based on its provider URL (not shown), to a custom external LLM 460. In some embodiments, the LLM Gateway 420 determines, based on the prompt, the provider URL 431, the associated credentials 432, or any combination thereof whether to send the prompt to the OpenAI LLM provider 450 or to the custom external LLM 460. In some embodiments, the LLM Gateway 420 sends the prompt to the OpenAI LLM provider 450 for general prompts that can be answered by the OpenAI LLM provider 450. In some embodiments, the LLM Gateway 420 sends prompts specific to an organization, an application, or other specialized department to the custom external LLM 460.

Figure 5:
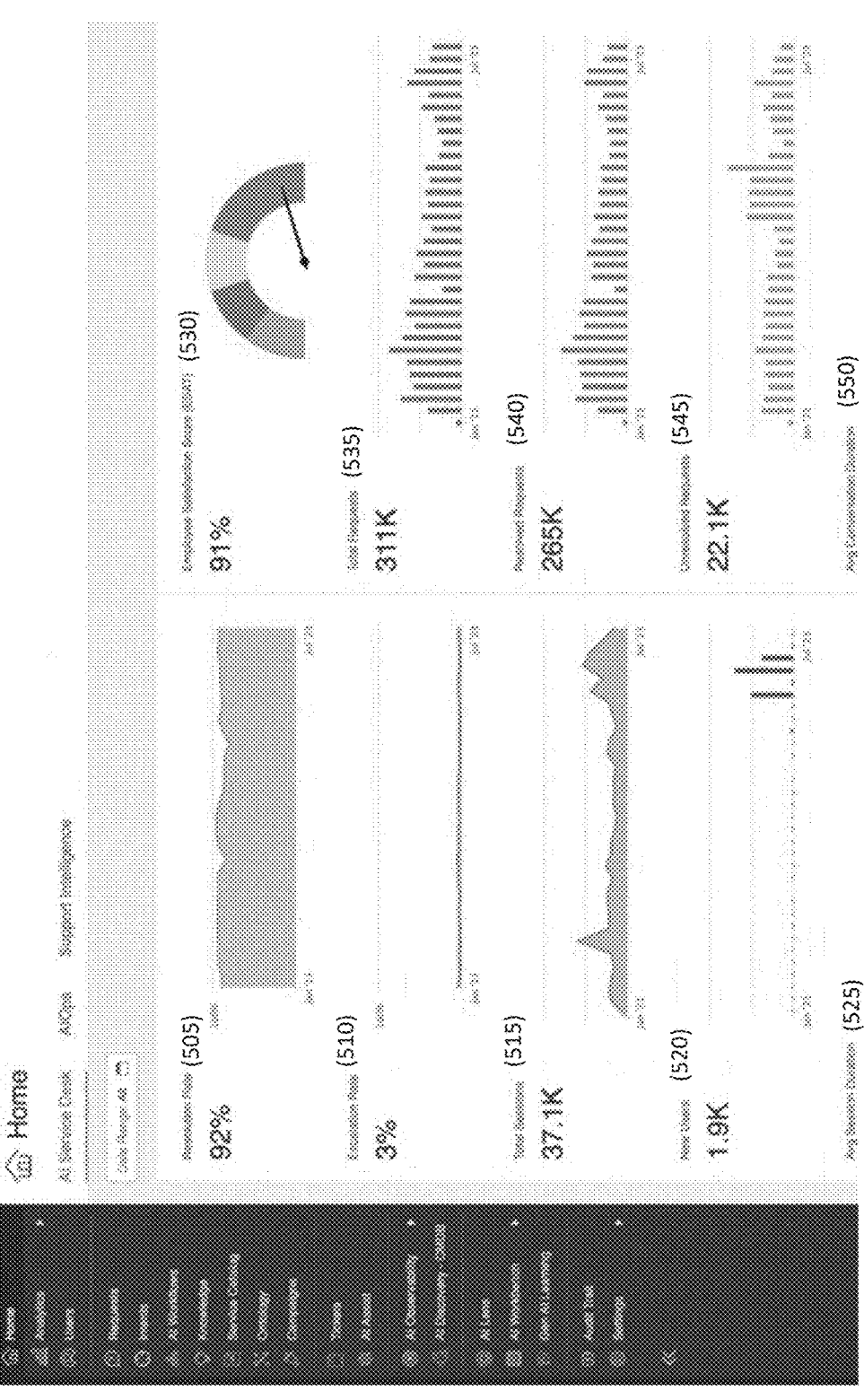
FIG. 5 shows a non-limiting example of a graphic user interface (GUI); in this case, a GUI for an admin console showing artificial intelligence (AI) service desk features.
Figure 6:
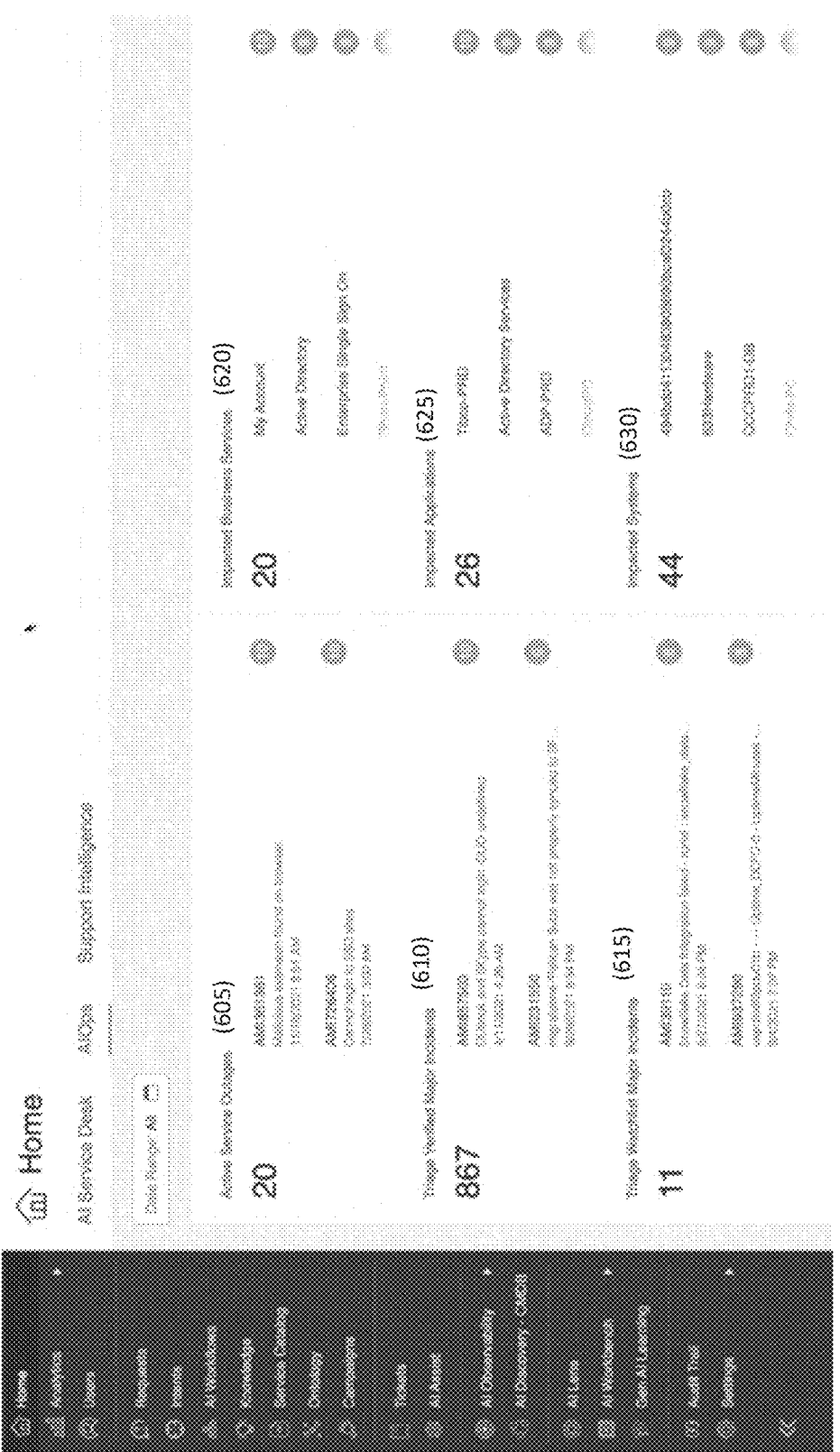
FIG. 6 shows a non-limiting example of a GUI; in this case, a GUI for an admin console showing AI ops desk features.
Figure 7:
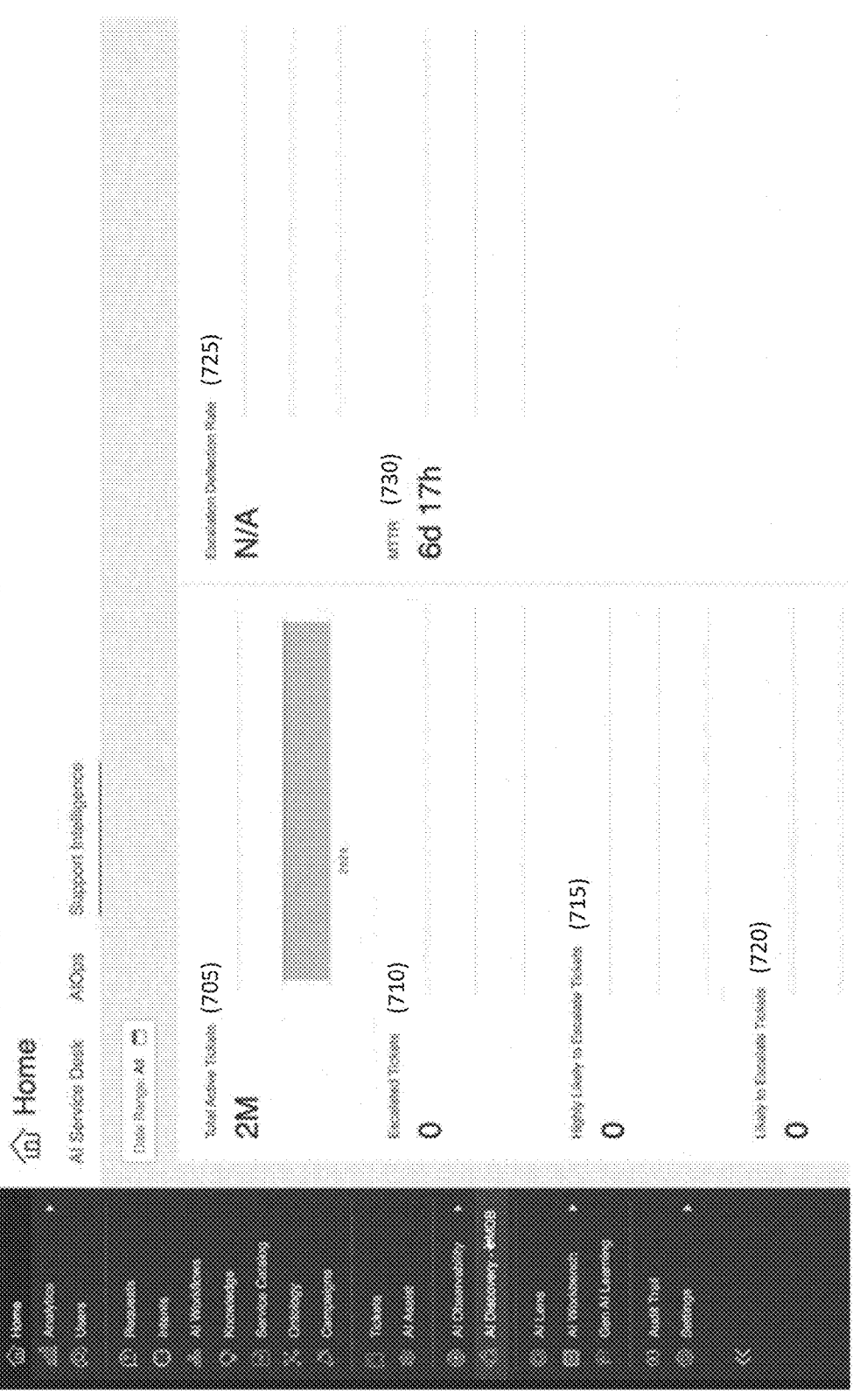
FIG. 7 shows a non-limiting example of a GUI; in this case, a GUI for an admin console showing AI support intelligence features.

In some embodiments, technology stack described herein includes an administrative (or admin) console. In further embodiments, the admin console includes a front-end interface, such as a GUI. In still further embodiments, the GUI includes features allowing an admin user to review and configure features of the technology described herein. By way of example, in some embodiments, per FIG. 5, a GUI for an admin console 500 includes navigation elements allowing a user to access, by way of examples, analytics, users, requests, intents, AI workflows, knowledge bases, service catalogs, ontologies, campaigns, tickets, AI assist, AI observatory, AI discovery, AI lens, AI workbench, gen AI learning, an audit trail, and settings. Further, in some embodiments, per FIG. 5, a GUI for an admin console 500 includes an AI service deck feature providing access to data pertaining to, for example, resolution rates 505, escalation rates 510, total sessions 515, new users 520, average session duration 525, employee satisfaction score 530, total requests 535, resolved requests 540, unresolved requests 545, and average conversation duration 550. By way of further example, in some embodiments, per FIG. 6, a GUI for an admin console 600 includes an AI ops feature providing access to data pertaining to, for example, active service outages 605, triage verified major incidents 610, triage watchlist major incidents 615, impacted business services 620, impacted applications 625, and impacted systems 630. By way of still further example, in some embodiments, per FIG. 7, a GUI for an admin console 700 includes an support intelligence feature providing access to data pertaining to, for example, total active tickets 705, escalated tickets 710, highly likely to escalate tickets 715, likely to escalate tickets 720, escalation deflection rate 725, and mean time to recovery, repair, respond, or resolve (MTTR) 730.

Overview

Described herein are computer-implemented systems and methods for optimizing the retrieval of data from multiple different destination software applications or systems. In some cases, ERP systems can comprise, for example, systems like SAP, Oracle ERP, and Microsoft Dynamics, or another ERP system. In some cases, the ERP system(s) can maintain an extensive range of financial information. In some cases, the financial information can comprise broad business budgets, in other cases the financial information can comprise specific transaction details, in yet other cases, the financial information can comprise a digitized reflection of an organization's financial health.

In some cases, destination software applications or systems can comprise CRM systems. In some cases, CRM systems can comprise systems dedicating to tracking interactions of an organization with its customers, in some cases, CRM systems can track every interaction between an organization and its customers. In some cases, the CRM can track sales inquiries, marketing campaigns, customer support issues, service notes, and/or other interactions between an organizations and its customers, or any combination thereof. In some cases, the CRM application or system can be Salesforce, Oracle CX, or Zoho, or another CRM. In some cases, the CRM can log each engagement, in some cases, the CRM can trace back engagement. In some cases, the CRM can trace engagements to initiate future engagement, in other cases the CRM can trace engagements to assess customer satisfaction, or both.

In some cases, an organization's databases can comprise platforms such as MySQL, Oracle Database, or Microsoft SQL Server, or another database, or any combination thereof. In some cases, these databases can be the primary repositories for storing a spectrum of data. In some cases, this data can include operational data, transactional data, and analytical data. In some cases, operational data can comprise data concerning day-to-day operations of the organization. In some cases, transactional data can comprise information generated from the organization's transactions. In some cases, analytical data can comprise processed data used for analysis and decision-making.

In some cases, destination software applications or systems can comprise SCM systems. In some cases, SCM systems can govern data relating to the flow of a company's goods and services. In some cases, the data can comprise records from raw material acquisitions, inventory levels, to distribution of finished products to customers, or any combination thereof. In some cases, the data is utilized by logistics and operations teams to manage business workflows effectively.

In some cases, destination software applications or systems can comprise HRM systems. In some cases, HRM systems can comprise employee-related data. In some cases, HRM systems maintain records comprising recruitment of individuals, onboarding process, payroll and benefits details, performance reviews, promotions, eventual exit of individuals, and any combination thereof.

In some cases, destination software applications or systems can comprise financial management systems. Financial management systems can comprise managing financial records. In some cases, financial records can comprise accounting, budgeting, future financial projections, and all other fiscal operations of the organization, or any combination thereof.

In some cases, destination software applications or systems can comprise PM systems. In some cases, PM systems can comprise tracking task assignments, deadlines, project timelines, resource allocation, progress of each project module, and any combination thereof.

In some cases, destination software applications or systems can comprise BI systems. In some cases, BI systems can encapsulate all the data analytics processes. In some cases, BI systems can sift through massive datasets to generate actional insights and support strategic decision-making.

In some cases, destination software applications or systems can comprise EDM systems. In some cases, EDM systems can be responsible for securely storing, managing, and tracking electronic documents and images, and any combination thereof. In some cases, the electronic documents and images can comprise contracts, technical diagrams, marketing brochures, project charts, other pieces of data, and any combination thereof.

In some cases, destination software applications or systems can be accessed through varied means like SQL, APIs, SDKs, or cloud-based integration platforms, or any combination thereof. In some cases, SQL can be used to create custom queries searching for specific data points. In some cases, APIs can provide a set of rules that dictate how software components interact, offering another method to retrieve data programmatically. In some cases, SDKs can contain pre-built components, effectively bundling APIs with additional functionality. In some cases, cloud-based integration platforms can offer a more hands-on approach to system integration, utilizing visually intuitive workflows to combine services.

Method Logical Architecture

Figure 8:
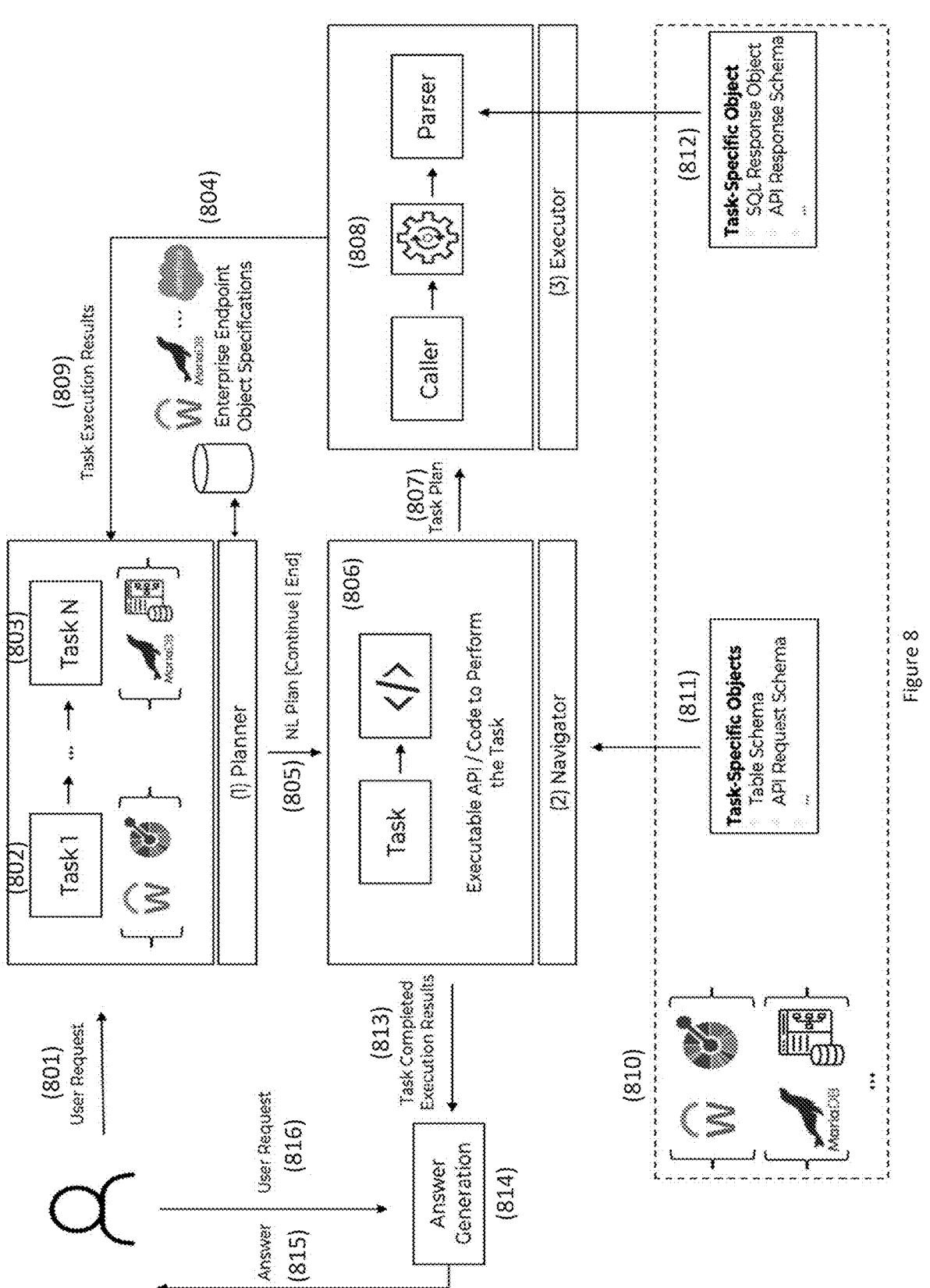
FIG. 8 shows a non-limiting diagram of exemplary functional blocks for decoding, planning, executing, and optimizing data retrieval from customer natural language input using natural language processing to create customized and optimized API or SQL code and generated answers.

Described here, in certain embodiments and depicted in FIG. 8, are computer-implemented methods for optimizing the retrieval of data from multiple different destination software applications or systems, the computer-implemented method can comprise: applying a planner module, which can interpret a user's query (801) by performing operations which can comprise: (a) receiving a user query input, and (b) decomposing the user query input into one or more sub-tasks (802), wherein each sub-task can be associated with a specific system and can be associated with an objective (803); applying a navigator module (806), which can generate a tailored approach for executing each of the one or more sub-tasks by performing operations which can comprise: analyzing the one or more sub-tasks of the planner module (805) and one or more system reference documents to identify one or more appropriate API's and/or generate one or more appropriate SQL codes (807); applying an executor module (808) which can execute one or more of the sub-tasks in the destination system (810) by performing operations which can comprise: (a) applying a caller component which can formulate appropriate caller parameters, and (b) applying a parser component which can identify and extract the relevant information; and applying a response generator module (814) which can generate one or more optimized final user responses (815), wherein the optimized final user response can be generated by compiling data retrieved from the executor module (811). In some embodiments, task-specific objects (812) can be sent back to the executor module, allowing task execution results (809) to be returned to the planner module, and task completed execution results (813) for the final response (815), which can prompt an additional user request to refine the results (816).

Planner Module

Figure 9:
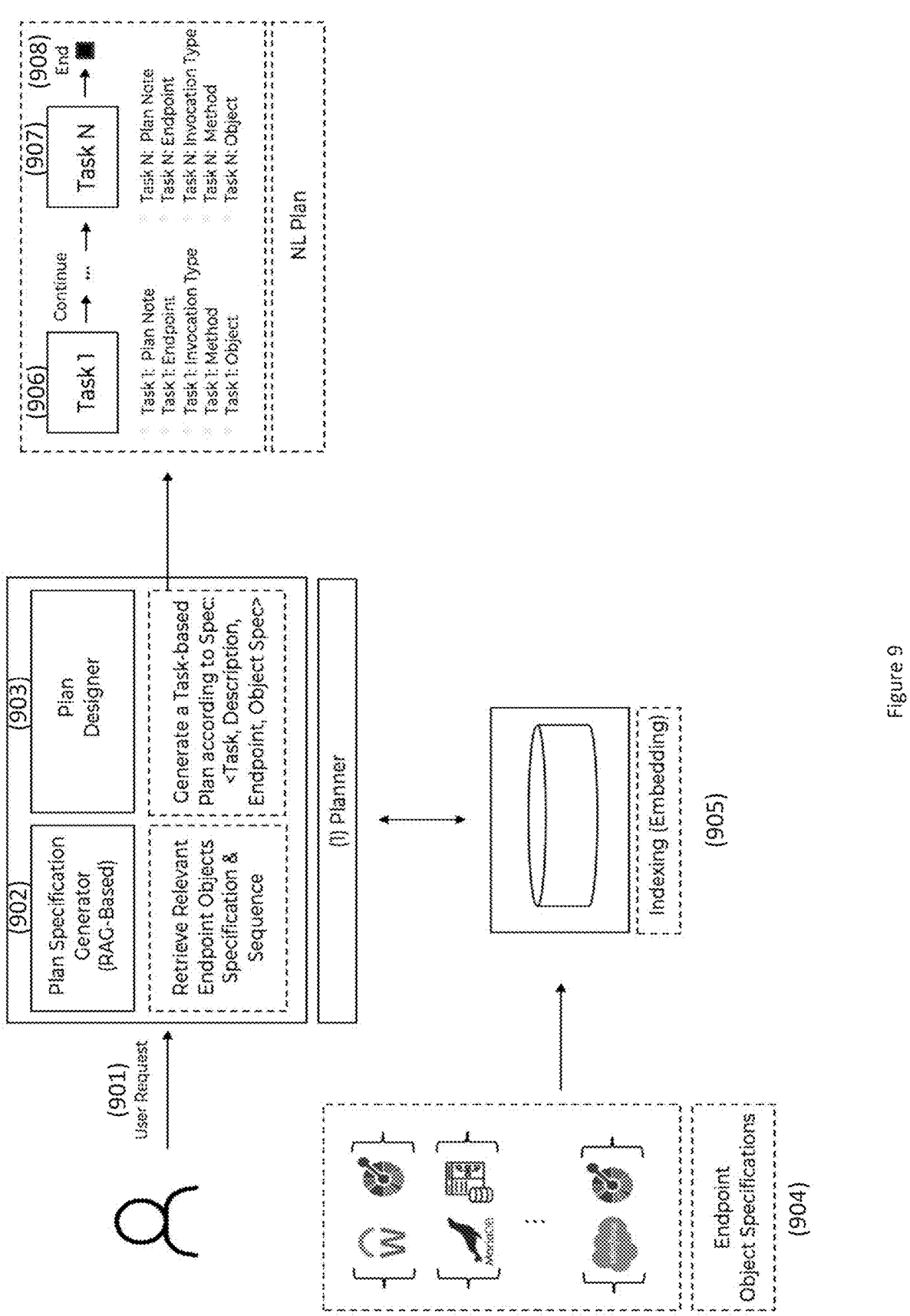
FIG. 9 shows a non-limiting diagram of exemplary functional blocks for optimizing executable sub-task generation from the task-based natural language user input from multiple destination software applications or systems.

In some embodiments, applying the planner module, depicted in FIG. 9, to interpret the user's query (901) can comprise determining an optimized sequence for completing each of the one or more sub-tasks. In some embodiments, the planner module can comprise a plan specification generator (902) and a plan designer (903). In some cases, the planner module can function strategically as the decision engine that can decipher the user request and deconstruct it into one or more manageable sub-tasks. In some cases, the planner module can deconstruct the user's request into one sub-task, two sub-tasks, four sub-tasks, five sub-tasks, six sub-tasks, seven sub-tasks, eight sub-tasks, nine sub-tasks, ten sub-tasks, eleven sub-tasks, twelve sub-tasks, thirteen sub-tasks, fourteen sub-tasks, fifteen sub-tasks, sixteen sub-tasks, seventeen sub-tasks, eighteen sub-tasks, nineteen sub-tasks, twenty sub-tasks, twenty-one sub-tasks, twenty-two sub-tasks, twenty-three sub-tasks, twenty-four sub-tasks, twenty-five sub-tasks, twenty-six sub-tasks, twenty-seven sub-tasks, twenty-eight sub-tasks, twenty-nine sub-tasks, thirty sub-tasks, thirty-one sub-tasks, thirty-two sub-tasks, thirty-three sub-tasks, thirty-four sub-tasks, thirty-five sub-tasks, thirty-six sub-tasks, thirty-seven sub-tasks, thirty-eight sub-tasks, thirty-nine sub-tasks, forty sub-tasks, forty-one sub-tasks, forty-two sub-tasks, forty-three sub-tasks, forty-four sub-tasks, forty-five sub-tasks, forty-six sub-tasks, forty-seven sub-tasks, forty-eight sub-tasks, forty-nine sub-tasks, fifty sub-tasks, fifty-one sub-tasks, fifty-two sub-tasks, fifty-three sub-tasks, fifty-four sub-tasks, fifty-five sub-tasks, fifty-six sub-tasks, fifty-seven sub-tasks, fifty-eight sub-tasks, fifty-nine sub-tasks, sixty sub-tasks, sixty-one sub-tasks, sixty-two sub-tasks, sixty-three sub-tasks, sixty-four sub-tasks, sixty-five sub-tasks, sixty-six sub-tasks, sixty-seven sub-tasks, sixty-eight sub-tasks, sixty-nine sub-tasks, seventy sub-tasks, seventy-one sub-tasks, seventy-two sub-tasks, seventy-three sub-tasks, seventy-four sub-tasks, seventy-five sub-tasks, seventy-six sub-tasks, seventy-seven sub-tasks, seventy-eight sub-tasks, seventy-nine sub-tasks, eighty sub-tasks, eighty-one sub-tasks, eighty-two sub-tasks, eighty-three sub-tasks, eighty-four sub-tasks, eighty-five sub-tasks, eighty-six sub-tasks, eighty-seven sub-tasks, eighty-eight sub-tasks, eighty-nine sub-tasks, ninety sub-tasks, ninety-one sub-tasks, ninety-two sub-tasks, ninety-three sub-tasks, ninety-four sub-tasks, ninety-five sub-tasks, ninety-six sub-tasks, ninety-seven sub-tasks, ninety-eight sub-tasks, ninety-nine sub-tasks, one hundred sub-tasks, or more than one hundred sub-tasks.

In some embodiments, applying the planner module to interpret the user's query (901) can comprise determining one or more optimal systems for completing each of the one or more sub-tasks. In some cases, applying the planner module to interpret the user's query (801) can comprise determining one optimal system, two optimal systems, three optimal systems, four optimal systems, five optimal systems, six optimal systems, seven optimal systems, eight optimal systems, nine optimal systems, ten optimal systems, eleven optimal systems, twelve optimal systems, thirteen optimal systems, fourteen optimal systems, fifteen optimal systems, sixteen optimal systems, seventeen optimal systems, eighteen optimal systems, nineteen optimal systems, twenty optimal systems, twenty-one optimal systems, twenty-two optimal systems, twenty-three optimal systems, twenty-four optimal systems, twenty-five optimal systems, or more than twenty-five optimal systems. In some cases, each focused action can be designed to achieve a particular objective. In some cases, every objective can contribute incrementally to the successful execution of the overall task sequence.

In some embodiments, determining the one or more optimal systems for completing each of the one or more sub-tasks can comprise integrating object specifications from each of the destination software applications or systems. In some cases, the planner module can map out the user's query (901) across disparate enterprise systems. In some cases, the planner module can identify the most efficient pathway through the multitude of enterprise systems. In some cases, the planner module can identify the most efficient pathway through one enterprise system, two enterprise systems, three enterprise systems, four enterprise systems, five enterprise systems, six enterprise systems, seven enterprise systems, eight enterprise systems, nine enterprise systems, ten enterprise systems, eleven enterprise systems, twelve enterprise systems, thirteen enterprise systems, fourteen enterprise systems, fifteen enterprise systems, sixteen enterprise systems, seventeen enterprise systems, eighteen enterprise systems, nineteen enterprise systems, twenty enterprise systems, twenty-one enterprise systems, twenty-two enterprise systems, twenty-three enterprise systems, twenty-four enterprise systems, twenty-five enterprise systems, or more than twenty-five enterprise systems.

In some embodiments, applying the planner module to interpret the user's query (901) can comprise generating recommendations for the planner module by analyzing one or more documents via a retrieval-augmented generation (RAG) component. In some cases, the RAG component can be an information retrieval system capable of generating an answer to a user request while operating to one or more documents being ingested. In some cases, the RAG can operate of two documents, five documents, ten documents, one hundred documents, five hundred documents, one thousand documents, ten thousand documents, fifty thousand documents, one million documents, two million documents, ten million documents, fifty million documents, one hundred million documents, or more than one hundred million documents. In some embodiments, the RAG component can interpret and index (905) one or more object specification files of the one or more of the destination software applications or systems. In some cases, the RAG component can interpret and index (905) two object specification files, five object specification files, ten object specification files, one hundred object specification files, five hundred object specification files, one thousand object specification files, ten thousand object specification files, fifty thousand object specification files, one million object specification files, two million object specification files, ten million object specification files, fifty million object specification files, one hundred million object specification files, or more than one hundred million object specification files.

In some embodiments, applying the planner module can comprise applying a large language learning model (LLM). In some cases, the LLM can be applied with the RAG. In some cases, the LLM can generate a prompt. In some cases, the LLM prompt can define plans using the recommendations provided by the RAG. In some embodiments, applying the planner module to decompose the user's query (901) can comprise integrating a LLM Plan Designer (903) component to define one or more sub-tasks. In some cases, the LLM Plan Designer (903) component can define the one or more sub-tasks based on the recommendations provided by the RAG component. In some cases, the LLM Plan Designer (903) component can define one sub-task, two sub-tasks, four sub-tasks, five sub-tasks, six sub-tasks, seven sub-tasks, eight sub-tasks, nine sub-tasks, ten sub-tasks, eleven sub-tasks, twelve sub-tasks, thirteen sub-tasks, fourteen sub-tasks, fifteen sub-tasks, sixteen sub-tasks, seventeen sub-tasks, eighteen sub-tasks, nineteen sub-tasks, twenty sub-tasks, twenty-one sub-tasks, twenty-two sub-tasks, twenty-three sub-tasks, twenty-four sub-tasks, twenty-five sub-tasks, twenty-six sub-tasks, twenty-seven sub-tasks, twenty-eight sub-tasks, twenty-nine sub-tasks, thirty sub-tasks, thirty-one sub-tasks, thirty-two sub-tasks, thirty-three sub-tasks, thirty-four sub-tasks, thirty-five sub-tasks, thirty-six sub-tasks, thirty-seven sub-tasks, thirty-eight sub-tasks, thirty-nine sub-tasks, forty sub-tasks, forty-one sub-tasks, forty-two sub-tasks, forty-three sub-tasks, forty-four sub-tasks, forty-five sub-tasks, forty-six sub-tasks, forty-seven sub-tasks, forty-eight sub-tasks, forty-nine sub-tasks, fifty sub-tasks, fifty-one sub-tasks, fifty-two sub-tasks, fifty-three sub-tasks, fifty-four sub-tasks, fifty-five sub-tasks, fifty-six sub-tasks, fifty-seven sub-tasks, fifty-eight sub-tasks, fifty-nine sub-tasks, sixty sub-tasks, sixty-one sub-tasks, sixty-two sub-tasks, sixty-three sub-tasks, sixty-four sub-tasks, sixty-five sub-tasks, sixty-six sub-tasks, sixty-seven sub-tasks, sixty-eight sub-tasks, sixty-nine sub-tasks, seventy sub-tasks, seventy-one sub-tasks, seventy-two sub-tasks, seventy-three sub-tasks, seventy-four sub-tasks, seventy-five sub-tasks, seventy-six sub-tasks, seventy-seven sub-tasks, seventy-eight sub-tasks, seventy-nine sub-tasks, eighty sub-tasks, eighty-one sub-tasks, eighty-two sub-tasks, eighty-three sub-tasks, eighty-four sub-tasks, eighty-five sub-tasks, eighty-six sub-tasks, eighty-seven sub-tasks, eighty-eight sub-tasks, eighty-nine sub-tasks, ninety sub-tasks, ninety-one sub-tasks, ninety-two sub-tasks, ninety-three sub-tasks, ninety-four sub-tasks, ninety-five sub-tasks, ninety-six sub-tasks, ninety-seven sub-tasks, ninety-eight sub-tasks, ninety-nine sub-tasks, one hundred sub-tasks, or more than one hundred sub-tasks (906), (907).

In some cases, determining the optimized sequence for completing each of the one or more sub-tasks can comprise ordering each sub-task in a Planner Queue component of the planner module. In some cases, each supported destination system and/or application can be accompanied by its endpoint object specification file (904). In some cases, the endpoint specification file can support REST APIs. In some cases, the APIs can comprise an endpoint specification file (908). In some cases, the endpoint can comprise a Relational Database. In some cases, the endpoint can comprise a database schema for the relational database, which can describe the organization and storage of data in the database, and can define the relationship between various tables. In some cases, for each supported endpoint, the endpoint object specification file (904) can be ingested and indexed (905) by the RAG. In some cases, this operation can be an offline operation, and can be done once. In other cases, this operation can be an online operation. In other cases, this operation be done more than once.

In some embodiments, the method can further comprise sending each of the one or more sub-tasks (1102), (1103) to the navigator module in order of which sub-task entered the Planner Queue component earliest.

Navigator Module

Figure 11:
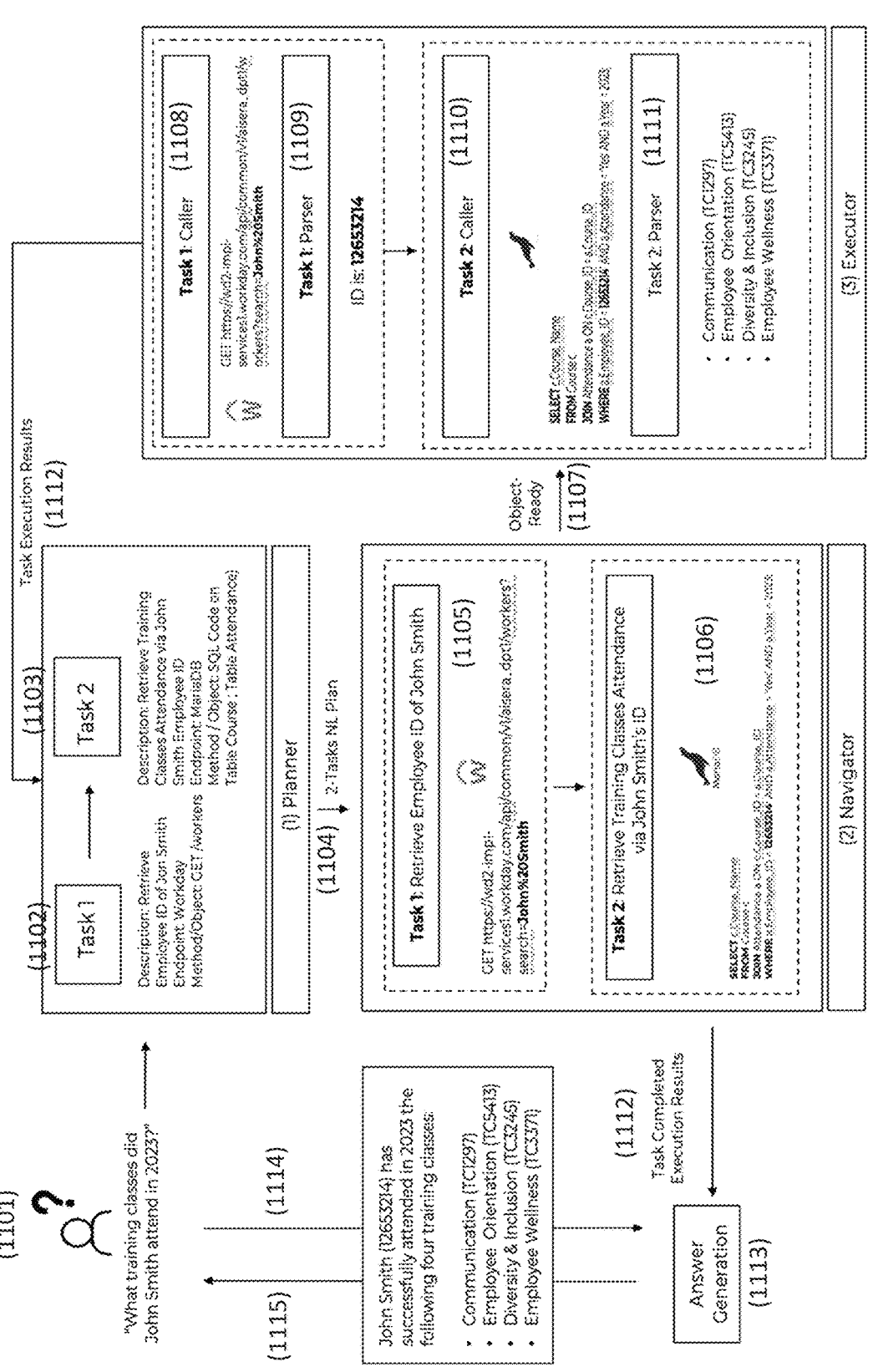
FIG. 11 shows a non-limiting diagram of exemplary functional blocks for optimized sub-task creation and execution, as well as internal checkpoints for optimized natural language answer generation in response to natural language input user queries.

The modules are further illustrated in FIG. 11. In some embodiments, the method can further comprise applying the navigator module. In some cases, the navigator module can analyze the task planner notes (1104). In some cases, the task planner notes (1104) can comprise endpoint of operation and task description. In some cases, the navigator module can analyze corresponding endpoint reference documents. In some cases, corresponding endpoint documents can include SQL schemas, API descriptions, and other endpoint access specifications (1105). In some cases, API descriptions can include query input parameters and response object schema. In some cases, endpoint access specifications can be for an API-base system, which can comprise baseURL, parentResource, versionNumber, instanceName, or additional API-base systems (1106).

In some embodiments, applying the navigator module to generate the tailored approach further comprises translating each of the sub-tasks generated by the planner module into one or more system-focused sub-tasks (1105), (1106). In some embodiments, translating each of the sub-tasks into the system-focused sub-tasks can comprise integrating task-specific objects (1107). In some embodiments, the task-specific objects can comprise one or more table schemas (1001), (1004) or one or more API request schemas. In some cases, table schemas can comprise listed strings of objects contained in the table (1002), (1005). Table schemas are illustrated by FIG. 10. In some cases, the task-specific objects (1003), (1006) can comprise one schema, two schemas, three schemas, four schemas, five schemas, six schemas, seven schemas, eight schemas, nine schemas, ten schemas, eleven schemas, twelve schemas, thirteen schemas, fourteen schemas, fifteen schemas, sixteen schemas, seventeen schemas, eighteen schemas, nineteen schemas, twenty schemas, twenty-one schemas, twenty-two schemas, twenty-three schemas, twenty-four schemas, twenty-five schemas, twenty-six schemas, twenty-seven schemas, twenty-eight schemas, twenty-nine schemas, thirty schemas, thirty-one schemas, thirty-two schemas, thirty-three schemas, thirty-four schemas, thirty-five schemas, thirty-six schemas, thirty-seven schemas, thirty-eight schemas, thirty-nine schemas, forty schemas, forty-one schemas, forty-two schemas, forty-three schemas, forty-four schemas, forty-five schemas, forty-six schemas, forty-seven schemas, forty-eight schemas, forty-nine schemas, fifty schemas, fifty-one schemas, fifty-two schemas, fifty-three schemas, fifty-four schemas, fifty-five schemas, fifty-six schemas, fifty-seven schemas, fifty-eight schemas, fifty-nine schemas, sixty schemas, sixty-one schemas, sixty-two schemas, sixty-three schemas, sixty-four schemas, sixty-five schemas, sixty-six schemas, sixty-seven schemas, sixty-eight schemas, sixty-nine schemas, seventy schemas, seventy-one schemas, seventy-two schemas, seventy-three schemas, seventy-four schemas, seventy-five schemas, seventy-six schemas, seventy-seven schemas, seventy-eight schemas, seventy-nine schemas, eighty schemas, eighty-one schemas, eighty-two schemas, eighty-three schemas, eighty-four schemas, eighty-five schemas, eighty-six schemas, eighty-seven schemas, eighty-eight schemas, eighty-nine schemas, ninety schemas, ninety-one schemas, ninety-two schemas, ninety-three schemas, ninety-four schemas, ninety-five schemas, ninety-six schemas, ninety-seven schemas, ninety-eight schemas, ninety-nine schemas, one hundred schemas, or more than one hundred schemas.

In some embodiments, analyzing the one or more sub-tasks of the planner module can comprise analyzing one or more of: a task description, an endpoint to be invoked, an invocation type, a method of invocation, and/or an endpoint object specification (904), and any combination thereof. In some cases, the navigator module can intelligently identify an exact API to invoke. In some cases, the API to invoke can comprise an endpoint, an instance URL, input parameters, output parameters, or any combination thereof. In some cases, if the task necessitates a database query, the retriever can auto-generate an exact SQL code necessary to execute on the remote database. In some embodiments, applying the navigator module to generate the tailored approach can comprise accessing the one or more destination software applications or systems using SQL, APIs, SDK, or cloud-based integration platforms, or any combination thereof. In some embodiments, applying the navigator module to generate the tailored approach can comprise applying an LLM. In some embodiments, identifying the one or more appropriate API's and/or generating one or more appropriate SQL codes can comprise modifying the APIs or SQL codes using the LLM. In some embodiments, applying the navigator module to generate the tailored approach can comprise returning a preliminary output for a first sub-task. In some embodiments, the navigator module can utilize the preliminary output for the first sub-task to generate the tailored approach for one or more subsequent sub-tasks. In some cases, the navigator module can generate the tailored approach for one subsequent sub-task, two subsequent sub-tasks, three subsequent sub-tasks, four subsequent sub-tasks, five subsequent sub-tasks, six subsequent sub-tasks, seven subsequent sub-tasks, eight subsequent sub-tasks, nine subsequent sub-tasks, ten subsequent sub-tasks, eleven subsequent sub-tasks, twelve subsequent sub-tasks, thirteen subsequent sub-tasks, fourteen subsequent sub-tasks, fifteen subsequent sub-tasks, sixteen subsequent sub-tasks, seventeen subsequent sub-tasks, eighteen subsequent sub-tasks, nineteen subsequent sub-tasks, twenty subsequent sub-tasks, twenty-one subsequent sub-tasks, twenty-two subsequent sub-tasks, twenty-three subsequent sub-tasks, twenty-four subsequent sub-tasks, twenty-five subsequent sub-tasks, twenty-six subsequent sub-tasks, twenty-seven subsequent sub-tasks, twenty-eight subsequent sub-tasks, twenty-nine subsequent sub-tasks, thirty subsequent sub-tasks, thirty-one subsequent sub-tasks, thirty-two subsequent sub-tasks, thirty-three subsequent sub-tasks, thirty-four subsequent sub-tasks, thirty-five subsequent sub-tasks, thirty-six subsequent sub-tasks, thirty-seven subsequent sub-tasks, thirty-eight subsequent sub-tasks, thirty-nine subsequent sub-tasks, forty subsequent sub-tasks, forty-one subsequent sub-tasks, forty-two subsequent sub-tasks, forty-three subsequent sub-tasks, forty-four subsequent sub-tasks, forty-five subsequent sub-tasks, forty-six subsequent sub-tasks, forty-seven subsequent sub-tasks, forty-eight subsequent sub-tasks, forty-nine subsequent sub-tasks, fifty subsequent sub-tasks, fifty-one subsequent sub-tasks, fifty-two subsequent sub-tasks, fifty-three subsequent sub-tasks, fifty-four subsequent sub-tasks, fifty-five subsequent sub-tasks, fifty-six subsequent sub-tasks, fifty-seven subsequent sub-tasks, fifty-eight subsequent sub-tasks, fifty-nine subsequent sub-tasks, sixty subsequent sub-tasks, sixty-one subsequent sub-tasks, sixty-two subsequent sub-tasks, sixty-three subsequent sub-tasks, sixty-four subsequent sub-tasks, sixty-five subsequent sub-tasks, sixty-six subsequent sub-tasks, sixty-seven subsequent sub-tasks, sixty-eight subsequent sub-tasks, sixty-nine subsequent sub-tasks, seventy subsequent sub-tasks, seventy-one subsequent sub-tasks, seventy-two subsequent sub-tasks, seventy-three subsequent sub-tasks, seventy-four subsequent sub-tasks, seventy-five subsequent sub-tasks, seventy-six subsequent sub-tasks, seventy-seven subsequent sub-tasks, seventy-eight subsequent sub-tasks, seventy-nine subsequent sub-tasks, eighty subsequent sub-tasks, eighty-one subsequent sub-tasks, eighty-two subsequent sub-tasks, eighty-three subsequent sub-tasks, eighty-four subsequent sub-tasks, eighty-five subsequent sub-tasks, eighty-six subsequent sub-tasks, eighty-seven subsequent sub-tasks, eighty-eight subsequent sub-tasks, eighty-nine subsequent sub-tasks, ninety subsequent sub-tasks, ninety-one subsequent sub-tasks, ninety-two subsequent sub-tasks, ninety-three subsequent sub-tasks, ninety-four subsequent sub-tasks, ninety-five subsequent sub-tasks, ninety-six subsequent sub-tasks, ninety-seven subsequent sub-tasks, ninety-eight subsequent sub-tasks, ninety-nine subsequent sub-tasks, one hundred subsequent sub-tasks, or more than one hundred subsequent sub-tasks.

In some cases, the navigator module can interpret the planner module's broad strategy. In some cases, the navigator module can translate the planner' module's broad strategy into actionable and/or system-focused tasks that can be executed by the executor module. In some embodiments, the method can further comprise applying the navigator module to generate an expected output (1107). In some embodiments, the expected output (1107) can be provided to the executor module by the navigator module. In some embodiments, the expected output (1107) can comprise one or more parameters from a response object of the caller component output. In some cases, the navigator module can provide the executor module with an expected output (1107) after the caller component makes an API call or executes an SQL query. In some cases, this data can help the executor module.

Executor Module

In some embodiments, applying the caller component (1108) of the executor module to execute the one or more sub-tasks can comprise formulating one or more optimized request bodies. In some embodiments, applying the caller component (1108) of the executor module to execute the one or more sub-tasks can comprise formulating one or more commands aligning with system specifications. In other embodiments, applying the caller component of the executor module to execute the one or more sub-tasks can comprise both formulating one or more optimized request bodies and formulating one or more commands aligning with system specifications. In some embodiments, applying the parser component (1109) of the executor module to execute the one or more sub-tasks can comprise receiving information from a remote system. In some cases, the caller component (1110) can be activated after the navigator module identifies a suitable system and operation needed. In some cases, the caller component (1108) can formulate the appropriate calling parameters, request embodiments, and/or commands to ensure they align precisely with the system's specifications. In some cases, the caller component can ensure parameters align with system specifications. In some cases, the received response can be scoured by the parser component (1109). In some cases, the parser component (1109) can identify and extract relevant information. In some cases, relevant information can be headers, in API responses or tuples in SQL result sets. In some cases, the parser component (1109) can isolate and extract data that contributes to the final output result. In some cases, the caller component and parser component (1109) can allow the executor module to effectively navigate and extract data from one or more destination software applications or systems. In some embodiments, identifying and extracting the relevant information can comprise identifying and extracting headers in AIP responses or tuples in SQL result sets. In some embodiments, the relevant information can comprise one or more SQL response objects, or one or more API response schema. In some embodiments, the caller component can function in repetitive tasks (1110) and the parser component can function in repetitive tasks (1111).

Response Generator Module

In some embodiments, applying the response generator model (1113) to generate the one or more optimized final responses (1114) can comprise deriving the optimized response from the selected destination software applications. In some embodiments, applying the response generator model to generate the one or more optimized final responses can comprise comprises applying a LLM. In some embodiments, generating one or more of the optimized final user responses via the response generator module can comprise processing the data retrieved from the executor module (1112) with the LLM to generate the optimized final user responses (1114). In some cases, the response generator module can create a final user response (1114) using results obtained after executing all sub-tasks. In some cases, the response generator can formulate a precise answer to the user's request (1101). In some cases, the response (1114) can be comprehensive, contextual, and accurate. In some cases, the response can be derived from relevant destination software applications or systems.

System Verification Iterations

In some embodiments, the method can further comprise initiating internal verification checkpoints to verify successful execution of each sub-task. In some embodiments, the method can further comprise collecting logs for each of the one or more sub-tasks for each of the modules. In some embodiments, the method can further comprise outputting a notification (1115) to the user that the sub-task cannot be executed. In some embodiments, the method can further comprise outputting a customized notification (1115) to the user comprising the name of the sub-task that cannot be executed. In some embodiments, the method can further comprise returning the executor module results to the planner module. In some embodiments, the method can further comprise the planner module modifying the one or more sub-tasks based on the returned results. In some embodiments, the planner module can operate in an exhaustive modality upon receiving multiple returned results from the executor module. In some embodiments, the planner module can operate in a clarifying modality upon receiving multiple returned results from the executor module. In some embodiments, operating in the exhaustive modality can comprise applying the planner module to create a plan branch node for each returned result from the executor module. In some embodiments, the planner module can clone each of the one or more remaining sub-tasks into each plan branch. In some embodiments, operating in the clarification modality can comprise applying the response module to output a clarifying query to the user. In some embodiments, upon additional clarifying user input, the clarification modality can comprise applying the planner module to select one of the plan branches. In some embodiments, upon additional clarifying user input, the clarification modality can comprise applying the planner module to eliminate one of the plan branches. In some embodiments, the method can further comprise retrieving data from one or more of the destination software applications or systems selected from the group comprising: enterprise resource planning systems, customer relationship management systems, organization data repositories, supply chain management systems, human resource management systems, financial management systems, project management systems, business intelligence systems, or electronic document management systems, or any combination thereof.

System Logical Architecture

Also described herein, in certain embodiments, are one or more computer-implemented systems for optimizing the retrieval of data from multiple different destination software applications, the computer-implemented systems can comprise: a planner module which can be configured to interpret a user's query by performing operations which can comprise: (a) receiving a user query input, and (b) decomposing the user query input into one or more sub-tasks, wherein each sub-task can be associated with a specific system and an objective; a navigator module which can be configured to generate a tailored approach for executing each of the one or more sub-tasks by performing operations comprising: analyzing the one or more sub-tasks of the planner module and one or more system reference documents to identify one or more appropriate API's and/or generate one or more appropriate SQL codes; an executor module which can be configured to execute one or more of the sub-tasks in the destination system by performing operations comprising: (a) formulating appropriate caller parameters via a caller component, and (b) identifying and extracting the relevant information via a parser component; and a response generator module which can be configured to generate an optimized final user response, wherein the generator module can generate the optimized final user response by compiling data retrieved from the executor module.

Planner Module

In some embodiments, the planner module, depicted in FIG. 9, can interpret the user's query (901) by determining an optimized sequence for completing each of the one or more sub-tasks. In some embodiments, the planner module can comprise a plan specification generator (902) and a plan designer (903). In some cases, the planner module can function strategically as the decision engine that can decipher the user request and deconstruct it into one or more manageable sub-tasks. In some cases, the planner module can deconstruct the user's request into one sub-task, two sub-tasks, four sub-tasks, five sub-tasks, six sub-tasks, seven sub-tasks, eight sub-tasks, nine sub-tasks, ten sub-tasks, eleven sub-tasks, twelve sub-tasks, thirteen sub-tasks, fourteen sub-tasks, fifteen sub-tasks, sixteen sub-tasks, seventeen sub-tasks, eighteen sub-tasks, nineteen sub-tasks, twenty sub-tasks, twenty-one sub-tasks, twenty-two sub-tasks, twenty-three sub-tasks, twenty-four sub-tasks, twenty-five sub-tasks, twenty-six sub-tasks, twenty-seven sub-tasks, twenty-eight sub-tasks, twenty-nine sub-tasks, thirty sub-tasks, thirty-one sub-tasks, thirty-two sub-tasks, thirty-three sub-tasks, thirty-four sub-tasks, thirty-five sub-tasks, thirty-six sub-tasks, thirty-seven sub-tasks, thirty-eight sub-tasks, thirty-nine sub-tasks, forty sub-tasks, forty-one sub-tasks, forty-two sub-tasks, forty-three sub-tasks, forty-four sub-tasks, forty-five sub-tasks, forty-six sub-tasks, forty-seven sub-tasks, forty-eight sub-tasks, forty-nine sub-tasks, fifty sub-tasks, fifty-one sub-tasks, fifty-two sub-tasks, fifty-three sub-tasks, fifty-four sub-tasks, fifty-five sub-tasks, fifty-six sub-tasks, fifty-seven sub-tasks, fifty-eight sub-tasks, fifty-nine sub-tasks, sixty sub-tasks, sixty-one sub-tasks, sixty-two sub-tasks, sixty-three sub-tasks, sixty-four sub-tasks, sixty-five sub-tasks, sixty-six sub-tasks, sixty-seven sub-tasks, sixty-eight sub-tasks, sixty-nine sub-tasks, seventy sub-tasks, seventy-one sub-tasks, seventy-two sub-tasks, seventy-three sub-tasks, seventy-four sub-tasks, seventy-five sub-tasks, seventy-six sub-tasks, seventy-seven sub-tasks, seventy-eight sub-tasks, seventy-nine sub-tasks, eighty sub-tasks, eighty-one sub-tasks, eighty-two sub-tasks, eighty-three sub-tasks, eighty-four sub-tasks, eighty-five sub-tasks, eighty-six sub-tasks, eighty-seven sub-tasks, eighty-eight sub-tasks, eighty-nine sub-tasks, ninety sub-tasks, ninety-one sub-tasks, ninety-two sub-tasks, ninety-three sub-tasks, ninety-four sub-tasks, ninety-five sub-tasks, ninety-six sub-tasks, ninety-seven sub-tasks, ninety-eight sub-tasks, ninety-nine sub-tasks, one hundred sub-tasks, or more than one hundred sub-tasks.

In some embodiments, the planner module can interpret the user's query (901) by determining one or more optimal systems for completing each of the one or more sub-tasks. In some cases, the planner module can interpret the user's query (801) by determining one optimal system, two optimal systems, three optimal systems, four optimal systems, five optimal systems, six optimal systems, seven optimal systems, eight optimal systems, nine optimal systems, ten optimal systems, eleven optimal systems, twelve optimal systems, thirteen optimal systems, fourteen optimal systems, fifteen optimal systems, sixteen optimal systems, seventeen optimal systems, eighteen optimal systems, nineteen optimal systems, twenty optimal systems, twenty-one optimal systems, twenty-two optimal systems, twenty-three optimal systems, twenty-four optimal systems, twenty-five optimal systems, or more than twenty-five optimal systems. In some cases, each focused action can be designed to achieve a particular objective. In some cases, every objective can contribute incrementally to the successful execution of the overall task sequence.

In some embodiments, the planner module can determine the one or more optimal systems for completing each of the one or more sub-tasks by integrating object specifications from each of the destination software applications or systems. In some cases, the planner module can map out the user's query (901) across disparate enterprise systems. In some cases, the planner module can identify the most efficient pathway through the multitude of enterprise systems. In some cases, the planner module can identify the most efficient pathway through one enterprise system, two enterprise systems, three enterprise systems, four enterprise systems, five enterprise systems, six enterprise systems, seven enterprise systems, eight enterprise systems, nine enterprise systems, ten enterprise systems, eleven enterprise systems, twelve enterprise systems, thirteen enterprise systems, fourteen enterprise systems, fifteen enterprise systems, sixteen enterprise systems, seventeen enterprise systems, eighteen enterprise systems, nineteen enterprise systems, twenty enterprise systems, twenty-one enterprise systems, twenty-two enterprise systems, twenty-three enterprise systems, twenty-four enterprise systems, twenty-five enterprise systems, or more than twenty-five enterprise systems.

In some embodiments, the planner module can interpret the user's query (901) by generating recommendations for the planner module by analyzing one or more documents via a retrieval-augmented generation (RAG) component. In some cases, the RAG component can be an information retrieval system capable of generating an answer to a user request while operating to one or more documents being ingested. In some cases, the RAG can operate to two documents, five documents, ten documents, one hundred documents, five hundred documents, one thousand documents, ten thousand documents, fifty thousand documents, one million documents, two million documents, ten million documents, fifty million documents, one hundred million documents, or more than one hundred million documents. In some embodiments, the RAG component can interpret and index (905) one or more object specification files of the one or more of the destination software applications or systems. In some cases, the RAG component can interpret and index (905) two object specification files, five object specification files, ten object specification files, one hundred object specification files, five hundred object specification files, one thousand object specification files, ten thousand object specification files, fifty thousand object specification files, one million object specification files, two million object specification files, ten million object specification files, fifty million object specification files, one hundred million object specification files, or more than one hundred million object specification files.

In some embodiments, the planner module can comprise a large language learning model (LLM). In some cases, the LLM can be partnered with the RAG. In some cases, the LLM can generate a prompt. In some cases, the LLM prompt can define plans using the recommendations provided by the RAG. In some embodiments, the planner module can decompose the user's query (901) by integrating a LLM Plan Designer (903) component to define one or more sub-tasks. In some cases, the LLM Plan Designer (903) component can define the one or more sub-tasks based on the recommendations provided by the RAG component. In some cases, the LLM Plan Designer (903) component can define one sub-task, two sub-tasks, four sub-tasks, five sub-tasks, six sub-tasks, seven sub-tasks, eight sub-tasks, nine sub-tasks, ten sub-tasks, eleven sub-tasks, twelve sub-tasks, thirteen sub-tasks, fourteen sub-tasks, fifteen sub-tasks, sixteen sub-tasks, seventeen sub-tasks, eighteen sub-tasks, nineteen sub-tasks, twenty sub-tasks, twenty-one sub-tasks, twenty-two sub-tasks, twenty-three sub-tasks, twenty-four sub-tasks, twenty-five sub-tasks, twenty-six sub-tasks, twenty-seven sub-tasks, twenty-eight sub-tasks, twenty-nine sub-tasks, thirty sub-tasks, thirty-one sub-tasks, thirty-two sub-tasks, thirty-three sub-tasks, thirty-four sub-tasks, thirty-five sub-tasks, thirty-six sub-tasks, thirty-seven sub-tasks, thirty-eight sub-tasks, thirty-nine sub-tasks, forty sub-tasks, forty-one sub-tasks, forty-two sub-tasks, forty-three sub-tasks, forty-four sub-tasks, forty-five sub-tasks, forty-six sub-tasks, forty-seven sub-tasks, forty-eight sub-tasks, forty-nine sub-tasks, fifty sub-tasks, fifty-one sub-tasks, fifty-two sub-tasks, fifty-three sub-tasks, fifty-four sub-tasks, fifty-five sub-tasks, fifty-six sub-tasks, fifty-seven sub-tasks, fifty-eight sub-tasks, fifty-nine sub-tasks, sixty sub-tasks, sixty-one sub-tasks, sixty-two sub-tasks, sixty-three sub-tasks, sixty-four sub-tasks, sixty-five sub-tasks, sixty-six sub-tasks, sixty-seven sub-tasks, sixty-eight sub-tasks, sixty-nine sub-tasks, seventy sub-tasks, seventy-one sub-tasks, seventy-two sub-tasks, seventy-three sub-tasks, seventy-four sub-tasks, seventy-five sub-tasks, seventy-six sub-tasks, seventy-seven sub-tasks, seventy-eight sub-tasks, seventy-nine sub-tasks, eighty sub-tasks, eighty-one sub-tasks, eighty-two sub-tasks, eighty-three sub-tasks, eighty-four sub-tasks, eighty-five sub-tasks, eighty-six sub-tasks, eighty-seven sub-tasks, eighty-eight sub-tasks, eighty-nine sub-tasks, ninety sub-tasks, ninety-one sub-tasks, ninety-two sub-tasks, ninety-three sub-tasks, ninety-four sub-tasks, ninety-five sub-tasks, ninety-six sub-tasks, ninety-seven sub-tasks, ninety-eight sub-tasks, ninety-nine sub-tasks, one hundred sub-tasks, or more than one hundred sub-tasks (906), (907).

In some cases, the Planner Queue component of the planner module can determine the optimized sequence for completing each of the one or more sub-tasks by ordering each sub-task in the Planner Queue component of the planner module. In some cases, each supported destination system and/or application can be accompanied by its endpoint object specification file (904). In some cases, the endpoint specification file can support REST APIs. In some cases, the APIs can comprise an endpoint specification file (908). In some cases, the endpoint can comprise a Relational Database. In some cases, the endpoint can comprise a database schema for the relational database, which can describe the organization and storage of data in the database, and can define the relationship between various tables (1001), (1004). In some cases, for each supported endpoint, the endpoint object specification file (904) can be ingested and indexed (905) by the RAG. In some cases, this operation can be an offline operation, and can be done once. In other cases, this operation can be an online operation. In other cases, this operation be done more than once.

In some embodiments, the system can further comprise sending each of the one or more sub-tasks (1102), (1103) to the navigator module in order of which sub-task entered the Planner Queue component earliest.

Navigator Module

The modules are further illustrated in FIG. 11. In some embodiments, the system can further comprise the navigator module. In some cases, the navigator module can analyze the task planner notes (1104). In some cases, the task planner notes (1104) can comprise endpoint of operation and task description. In some cases, the navigator module can analyze corresponding endpoint reference documents. In some cases, corresponding endpoint documents can include SQL schemas, API descriptions, and other endpoint access specifications (1105). In some cases, API descriptions can include query input parameters and response object schema. In some cases, endpoint access specifications can be for an API-base system, which can comprise baseURL, parentResource, versionNumber, instanceName, or additional API-base systems (1106).

In some embodiments, the navigator module can generate the tailored approach by translating each of the sub-tasks generated by the planner module into one or more system-focused sub-tasks (1105), (1106). In some embodiments, translating each of the sub-tasks into the system-focused sub-tasks can comprise integrating task-specific objects (1107). In some embodiments, the task-specific objects can comprise one or more table schemas (1001), (1004) or one or more API request schemas. In some cases, table schemas can comprise listed strings of objects contained in the table (1002), (1005). Table schemas are illustrated by FIG. 10. In some cases, the task-specific objects (1003), (1006) can comprise one schema, two schemas, three schemas, four schemas, five schemas, six schemas, seven schemas, eight schemas, nine schemas, ten schemas, eleven schemas, twelve schemas, thirteen schemas, fourteen schemas, fifteen schemas, sixteen schemas, seventeen schemas, eighteen schemas, nineteen schemas, twenty schemas, twenty-one schemas, twenty-two schemas, twenty-three schemas, twenty-four schemas, twenty-five schemas, twenty-six schemas, twenty-seven schemas, twenty-eight schemas, twenty-nine schemas, thirty schemas, thirty-one schemas, thirty-two schemas, thirty-three schemas, thirty-four schemas, thirty-five schemas, thirty-six schemas, thirty-seven schemas, thirty-eight schemas, thirty-nine schemas, forty schemas, forty-one schemas, forty-two schemas, forty-three schemas, forty-four schemas, forty-five schemas, forty-six schemas, forty-seven schemas, forty-eight schemas, forty-nine schemas, fifty schemas, fifty-one schemas, fifty-two schemas, fifty-three schemas, fifty-four schemas, fifty-five schemas, fifty-six schemas, fifty-seven schemas, fifty-eight schemas, fifty-nine schemas, sixty schemas, sixty-one schemas, sixty-two schemas, sixty-three schemas, sixty-four schemas, sixty-five schemas, sixty-six schemas, sixty-seven schemas, sixty-eight schemas, sixty-nine schemas, seventy schemas, seventy-one schemas, seventy-two schemas, seventy-three schemas, seventy-four schemas, seventy-five schemas, seventy-six schemas, seventy-seven schemas, seventy-eight schemas, seventy-nine schemas, eighty schemas, eighty-one schemas, eighty-two schemas, eighty-three schemas, eighty-four schemas, eighty-five schemas, eighty-six schemas, eighty-seven schemas, eighty-eight schemas, eighty-nine schemas, ninety schemas, ninety-one schemas, ninety-two schemas, ninety-three schemas, ninety-four schemas, ninety-five schemas, ninety-six schemas, ninety-seven schemas, ninety-eight schemas, ninety-nine schemas, one hundred schemas, or more than one hundred schemas.

In some embodiments, the planner module analyzing the one or more sub-tasks can comprise analyzing one or more of: a task description, an endpoint to be invoked, an invocation type, a method of invocation, and/or an endpoint object specification (904), and any combination thereof. In some cases, the navigator module can intelligently identify an exact API to invoke. In some cases, the API to invoke can comprise an endpoint, an instance URL, input parameters, output parameters, or any combination thereof. In some cases, if the task necessitates a database query, the retriever can auto-generate an exact SQL code necessary to execute on the remote database. In some embodiments, the navigator module can generate the tailored approach by accessing the one or more destination software applications or systems using SQL, APIs, SDK, or cloud-based integration platforms, or any combination thereof. In some embodiments, the navigator module can generate the tailored approach by applying an LLM. In some embodiments, the appropriate API's and SQL codes can be identified by modifying the APIs or SQL codes using the LLM. In some embodiments, the navigator module can generate the tailored approach by returning a preliminary output for a first sub-task. In some embodiments, the navigator module can utilize the preliminary output for the first sub-task to generate the tailored approach for one or more subsequent sub-tasks. In some cases, the navigator module can generate the tailored approach for one subsequent sub-task, two subsequent sub-tasks, three subsequent sub-tasks, four subsequent sub-tasks, five subsequent sub-tasks, six subsequent sub-tasks, seven subsequent sub-tasks, eight subsequent sub-tasks, nine subsequent sub-tasks, ten subsequent sub-tasks, eleven subsequent sub-tasks, twelve subsequent sub-tasks, thirteen subsequent sub-tasks, fourteen subsequent sub-tasks, fifteen subsequent sub-tasks, sixteen subsequent sub-tasks, seventeen subsequent sub-tasks, eighteen subsequent sub-tasks, nineteen subsequent sub-tasks, twenty subsequent sub-tasks, twenty-one subsequent sub-tasks, twenty-two subsequent sub-tasks, twenty-three subsequent sub-tasks, twenty-four subsequent sub-tasks, twenty-five subsequent sub-tasks, twenty-six subsequent sub-tasks, twenty-seven subsequent sub-tasks, twenty-eight subsequent sub-tasks, twenty-nine subsequent sub-tasks, thirty subsequent sub-tasks, thirty-one subsequent sub-tasks, thirty-two subsequent sub-tasks, thirty-three subsequent sub-tasks, thirty-four subsequent sub-tasks, thirty-five subsequent sub-tasks, thirty-six subsequent sub-tasks, thirty-seven subsequent sub-tasks, thirty-eight subsequent sub-tasks, thirty-nine subsequent sub-tasks, forty subsequent sub-tasks, forty-one subsequent sub-tasks, forty-two subsequent sub-tasks, forty-three subsequent sub-tasks, forty-four subsequent sub-tasks, forty-five subsequent sub-tasks, forty-six subsequent sub-tasks, forty-seven subsequent sub-tasks, forty-eight subsequent sub-tasks, forty-nine subsequent sub-tasks, fifty subsequent sub-tasks, fifty-one subsequent sub-tasks, fifty-two subsequent sub-tasks, fifty-three subsequent sub-tasks, fifty-four subsequent sub-tasks, fifty-five subsequent sub-tasks, fifty-six subsequent sub-tasks, fifty-seven subsequent sub-tasks, fifty-eight subsequent sub-tasks, fifty-nine subsequent sub-tasks, sixty subsequent sub-tasks, sixty-one subsequent sub-tasks, sixty-two subsequent sub-tasks, sixty-three subsequent sub-tasks, sixty-four subsequent sub-tasks, sixty-five subsequent sub-tasks, sixty-six subsequent sub-tasks, sixty-seven subsequent sub-tasks, sixty-eight subsequent sub-tasks, sixty-nine subsequent sub-tasks, seventy subsequent sub-tasks, seventy-one subsequent sub-tasks, seventy-two subsequent sub-tasks, seventy-three subsequent sub-tasks, seventy-four subsequent sub-tasks, seventy-five subsequent sub-tasks, seventy-six subsequent sub-tasks, seventy-seven subsequent sub-tasks, seventy-eight subsequent sub-tasks, seventy-nine subsequent sub-tasks, eighty subsequent sub-tasks, eighty-one subsequent sub-tasks, eighty-two subsequent sub-tasks, eighty-three subsequent sub-tasks, eighty-four subsequent sub-tasks, eighty-five subsequent sub-tasks, eighty-six subsequent sub-tasks, eighty-seven subsequent sub-tasks, eighty-eight subsequent sub-tasks, eighty-nine subsequent sub-tasks, ninety subsequent sub-tasks, ninety-one subsequent sub-tasks, ninety-two subsequent sub-tasks, ninety-three subsequent sub-tasks, ninety-four subsequent sub-tasks, ninety-five subsequent sub-tasks, ninety-six subsequent sub-tasks, ninety-seven subsequent sub-tasks, ninety-eight subsequent sub-tasks, ninety-nine subsequent sub-tasks, one hundred subsequent sub-tasks, or more than one hundred subsequent sub-tasks.

In some cases, the navigator module can interpret the planner module's broad strategy. In some cases, the navigator module can translate the planner' module's broad strategy into actionable and/or system-focused tasks that can be executed by the executor module. In some embodiments, the system can further comprise the navigator module generating an expected output (1107). In some embodiments, the expected output (1107) can be provided to the executor module by the navigator module. In some embodiments, the expected output (1107) can comprise one or more parameters from a response object of the caller component output. In some cases, the navigator module can provide the executor module with an expected output (1107) after the caller component makes an API call or executes an SQL query. In some cases, this data can help the executor module.

Executor Module

In some embodiments, the caller component (1108) of the executor module can execute the one or more sub-tasks by formulating one or more optimized request bodies. In some embodiments, the caller component (1108) of the executor module can execute the one or more sub-tasks by formulating one or more commands aligning with system specifications. In other embodiments, the caller component of the executor module can execute the one or more sub-tasks by both formulating one or more optimized request bodies and formulating one or more commands aligning with system specifications. In some embodiments, the parser component (1109) of the executor module can execute the one or more sub-tasks by receiving information from a remote system. In some cases, the caller component (1110) can be activated after the navigator module identifies a suitable system and operation needed. In some cases, the caller component (1108) can formulate the appropriate calling parameters, request embodiments, and/or commands to ensure they align precisely with the system's specifications. In some cases, the caller component can ensure parameters align with system specifications. In some cases, the received response can be scoured by the parser component (1109). In some cases, the parser component (1109) can identify and extract relevant information. In some cases, relevant information can be headers, in API responses or tuples in SQL result sets. In some cases, the parser component (1109) can isolate and extract data that contributes to the final output result. In some cases, the caller component and parser component (1109) can allow the executor module to effectively navigate and extract data from one or more destination software applications or systems. In some embodiments, headers in AIP responses or tuples in SQL result sets can be identified and extracted. In some embodiments, the relevant information can comprise one or more SQL response objects, or one or more API response schema. In some embodiments, the caller component can function in repetitive tasks (1110) and the parser component can function in repetitive tasks (1111).
Response Generator Module In some embodiments, the response generator model (1113) can generate the one or more optimized final responses (1114) by deriving the optimized response from the selected destination software applications. In some embodiments, the response generator model can generate the one or more optimized final responses by applying a LLM. In some embodiments, the one or more optimized final user responses can be generated via the response generator module by processing the data retrieved from the executor module (1112) with the LLM to generate the optimized final user responses (1114). In some cases, the response generator module can create a final user response (1114) using results obtained after executing all sub-tasks. In some cases, the response generator can formulate a precise answer to the user's request (1101). In some cases, the response (1114) can be comprehensive, contextual, and accurate. In some cases, the response can be derived from relevant destination software applications or systems.
System Verification Iterations In some embodiments, the system can further comprise internal verification checkpoints to verify successful execution of each sub-task. In some embodiments, the system can further comprise logs collected for each of the one or more sub-tasks for each of the modules. In some embodiments, the system can further comprise output comprising a notification (1115) to the user that the sub-task cannot be executed. In some embodiments, the system can further comprise output comprising a customized notification (1115) to the user comprising the name of the sub-task that cannot be executed. In some embodiments, the system can further comprise output comprising returning the executor module results to the planner module. In some embodiments, the system can further comprise the planner module modifying the one or more sub-tasks based on the returned results. In some embodiments, the planner module can operate in an exhaustive modality upon receiving multiple returned results from the executor module. In some embodiments, the planner module can operate in a clarifying modality upon receiving multiple returned results from the executor module. In some embodiments, the planner module operating in the exhaustive modality can comprise applying the planner module to create a plan branch node for each returned result from the executor module. In some embodiments, the planner module can clone each of the one or more remaining sub-tasks into each plan branch. In some embodiments, the planner module operating in the clarification modality can comprise applying the response module to output a clarifying query to the user. In some embodiments, upon additional clarifying user input, the clarification modality can comprise applying the planner module to select one of the plan branches. In some embodiments, upon additional clarifying user input, the clarification modality can comprise applying the planner module to eliminate one of the plan branches. In some embodiments, the system can further comprise data retrieved from one or more of the destination software applications or systems selected from the group comprising: enterprise resource planning systems, customer relationship management systems, organization data repositories, supply chain management systems, human resource management systems, financial management systems, project management systems, business intelligence systems, or electronic document management systems, or any combination thereof.

In some embodiments, the system can further comprise a neural network.

In some embodiments, the system can further comprise a deep neural network.

EXAMPLES

The following illustrative examples are representative of embodiments of the software applications, systems, and methods described herein and are not meant to be limiting in any way.

Example 1: Planner Module LLM Prompt
Workflow Automation Design

The following is an exemplary prompt generated from the Plan Specification Generator to the LLM Plan Designer:
PLANNER MODULE—PROMPT START ##
Act as an expert in Workflow Automation Design, which is a sequence of calls to endpoints you need to make, in a specific order, to answer my user request $userRequest.
I want you to process my request ($userRequest) and return your response in a JSON-format output ($NLPlanJSON):
{
"endpoint": string,
"invocation type": string,
"method": string,
"object": strings,
"plan_note": strings,
}
Process my $userRequest using step-by-step the instructions below:
Instruction 1. Read carefully the provided documents ($ragObjects) and deeply understand the endpoint, and the endpoint objects details.
Instruction 2. Provide the end-to-end call sequence (called the NL Plan) to answer my $userRequest using $ragObjects. For each call in the NL Plan, save the endpoint to be invoked in "endpoint", the invocation type (like invocation type=SQL or invocation type=REST API) in "invocation type", the method and object in "method" and "object (like for SQL save SQL in "method", and table names needed separated by commas in "object"; like for API save GET or POST in "method" and the API URL in "object"). Finally, save your reasoning for calling this endpoint call in "plan_note".

Instruction 3. Verify the correctness of the NLP Plan, by checking both the correctness of each call in the NL Plan and the correctness of the sequential order of invocation of the calls in the NL Plan. If you find issues, correct them.

The $ragObjects are: {rag_objects}.
My $userRequest is: {user_request}.
The $NLPlanJSON is:
PLANNER MODULE—PROMPT END #####

Example 2: Navigator Module LLM Endpoint
Invocation

The following is an exemplary prompt generated by the navigator module to invoke an endpoint from a destination database, program, or system using the executor module. The navigator module reconstructs a final API or SQL code from an advanced LLM prompt, and passes the final API or SQL code to the executor module for execution in the following example:

NAVIGATOR MODULE—PROMPT START #####

I want you to process a task provided by the Planner module (taskPlanner) and return your response in a JSON-format output (responseJSON):

"api_request":
{
"method": string,
"endpoint": string,
"instance_endpoint": string,
"input_parameter": strings,
"output_parameter": strings,
}

Process taskPlanner request using step-by-step the Instructions below:

Instruction 1. Read carefully endpointObjectSpecification and understand in detail how to call the API, the associated input parameter(s), and response object field(s).

Instruction 2. Process the API, and save the API in "api_request". Save API method in "method". Save API endpoint in "endpoint". Construct the instance endpoint by concatenating baseURL, parentResource, versionNumber, instanceName and "endpoint" using the "Λ" character. Save the constructed instance endpoint into "instance_endpoint". Notice that the baseURL and instanceName are always the same for each API request (and are given as input). Conversely, the parentResource and versionNumber are associated to the API category, meaning all APIs belonging to the same API category have the exact same parentResource and versionNumber (they will be included in endpointObjectSpecification).

Instruction 3. For the API you are using, remember what input parameter you need to provide to call the API and what output parameter you need to extract from the API response object. Remember, neither input nor output parameters can be made up. Save as output parameters only the parameter the taskPlanner is asking. Save the input parameters in "input_parameter".

Instruction 4. Revise the "instance_endpoint" of each API by ensuring that you pass as the input parameter what is saved in "input_parameter".

Return ONLY responseJSON in response to my user request userRequest. No more information shall be returned.

The taskPlanner is: {task_planner}.
The endpointObjectSpecification is: { }.
My responseJSON is:
NAVIGATOR MODULE—PROMPT END#####

Example 3: Navigator Module LLM Endpoint
Invocation

The following is an exemplary prompt generated by the navigator module to cause the answer generation module to generate a response using a LLM:

NAVIGATOR MODULE—PROMPT START #####

I want you to generate an answer (genAnswer) to a user request (userRequest) by following the instructions below, one-by-one:

Instruction 1. Read carefully the user request userRequest.

Instruction 2. Read carefully the sequence of "task description>task result" given in executionResults.

Instruction 3. Generate your final answer (genAnwer) to userRequest (userRequest) using the content in executionResults.

The userRequest is {user_request}.
The executionResults is {execution_results}.
My final answer (genAnswer) is:
NAVIGATOR MODULE-PROMPT END #####

Example 4: System Functionality from User
Prompt to Answer Generation

The following is an exemplary functional process for the system to return a result from the user prompt. The example uses an Enterprise setup with two backend systems, one being, for example, a MariaDB Database used to manage employee records, for example employee ID<employee organization, employee profiles, employee hiring records, employee performance evaluation, and more records. The MariaDB Database in this example comprises two tables as shown in FIG. 10, a Course table (1001) and an Attendance table (1004). The following is an exemplary system functionality illustration in response to a natural language user request of "What training classes did John Smith attend in 2023?":

The planner module receives the user request and identifies, in this example, two specific sub-tasks that need to be executed in a specific sequence.

Task 1 for the planner module comprises, in this example, retrieving the Employee ID associated with the employee John Smith ("plan_note" for Task 1). The system, in this example, knows that the Employee ID associated with the employee John Smith is available in the Workday CRM system ("endpoint" for Task 1). The system, in this example, retrieves the Employee ID associated with the employee John Smith using REST API ("invocation type" for Task 1). The system, in this example, does so by using method GET ("method" for Task 1). The system, in this example, retrieves the Employee ID associated with employee John Smith by further using the object (URL)/worker?search ("object" for Task 1).

{
"endpoint": "Workday",
"invocation type": "REST API",

```
"method": GET
"object": /workers/search
"plan_note": "Retrieve the employee ID of John Smith
    using the GET/workers?search=API. This is necessary
    because the Attendance table in MariaDB uses
    Employee ID, not the employee name."
}
```

Task 2 for the planner module, in this example, comprises retrieving the employee course attendance from MariaDB using the employee ID obtained from the execution of Task 1 ("plan note" of Task 2). In this example, Task 2 operates on MariaDB ("endpoint" of Task 2) via SQL code ("invocation type" of Task 2). In this example, Task 2 uses SQL code ("method" of Task 2) operating on the Course Table and the Attendance Table ("objects" of Task 2). In this example, because there are two table "objects", Task 2 iterates the operation twice.

```
{
"endpoint": "MariaDB",
"invocation type": "SQL",
"method": SQL Code
"objects": Table Courses, Table Attendance
"plan_note": "Query the Attendance table using the
    retrieved Employee ID and the year 2023 to get the
    Course ID of the training class John Smith attended. By
    Querying the Course Table we can retrieve the Course
    Name from the retrieved Course IDs."
}
```

In this example, the planner module instructs the navigator module and the executor module to: complete one task at a time, perform two iterations of each task, and start with Task 1. In this example, after the employee ID is obtained, only then does the planner module prompt the navigator module and executor module to complete Task 2, in this example comprising retrieving the training course attendance.

In this example, when the navigator module receives the Task 1 request from the planner module, it will again verify the GET/worker?search API specification for Workday before reconstructing the URL used to call the API and the input parameters to be passed to the execution module, for Task 1, the name of the person ("John Smith").

In this example, the navigator module prepares to prompt the executor module by identifying the exact output parameter that the executor module needs to parse out from the API response object the desired output parameter ("id"). The following is an exemplary output of the navigator module received by the executor module:

```
{
"api_request": [{
"method": "GET",
"endpoint": "/workers?search=",
"instance_endpoint":                      "https://wd2-impl-
    services1.workday.com/api/common/v1/aisera_dpt1/
    workers?search=John%20Smith",
"input_parameter": "John Smith",
"output_parameter": "id"
}
]
}
```

In this example, the executor module receives the output of the navigator module, and the executor module executes the API call to Workday. In this example, the executor module then sends the API response JSON object to the parser component of the executor module. In this example, the parser component of the executor module follows the navigator module instruction "output_parameter" by retrieving the result "John Smith Employee ID is: 12653214".

In this example module, the executor module sends the result "John Smith Employee ID is: 12653214" to the planner module. In this example, the planner module acknowledges the successful completion of Task 1 and triggers the second iteration to complete Task 2.

In this example, the navigator module receives the Task 2 instructions from the planner module associated with MariaDB. In this example, the navigator module will then use the Table Schema documentation to generate the SQL code to run on MariaDB on the Course Table and Attendance Table to retrieve course attendance output. In this example, the SQL code is then passed by the navigator module to the executor module, which runs the SQL code on the MariaDB Database. In this example, the returned object is then parsed by the parser component of the executor module, which returns the results:

Communication (TC1297)
Employee Orientation (TC5413)
Diversity & Inclusion (TC3245)
Employee Wellness (TC3371)

In this example, these results are returned to the planner module. In this example, the planner module acknowledges the successful execution of Task 2. The planner module realizes that no more tasks of its plan need to be executed, and forwards the plan execution results to the answer generation module.

In this example, the answer generation module receives the original user request and the final execution results, and composes the final answer. In this example, the final answer is returned to the user in natural language form using a LLM, resolving the user request as follows:

"John Smith has successfully attended in 2023 the following four training classes: Communication (TC1297), Employee Orientation (TC5413), Diversity & Inclusion (TC3245), and Employee Wellness (TC3371)".

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the present disclosure may be employed in practicing the present disclosure. It is intended that the following claims define the scope of the present disclosure and that methods and structures within the scope of these claims and their equivalents be covered thereby.

What is claimed is:

1. A computer-implemented method of optimizing the retrieval of data from multiple different destination software applications or systems, the computer-implemented method comprising:

applying a planner module to interpret a user's query by performing operations comprising:

a) receiving a user query input, and b) decomposing the user query input into one or more sub-tasks, wherein each sub-task is associated with a specific system and an objective;

applying a navigator module to generate a tailored approach for executing each of the one or more sub-tasks by performing operations comprising: analyzing the one or more sub-tasks of the planner module and one or more system reference documents to identify one or more appropriate API's and/or generate one or more appropriate SQL codes;

applying an executor module to execute one or more of the sub-tasks in the destination system by performing operations comprising:

a) applying a caller component to formulate appropriate caller parameters, and b) applying a parser component to identify and extract the relevant information; and applying a response generator module to generate one or more optimized final user responses, wherein the optimized final user response is generated by compiling data retrieved from the executor module.

2. The computer-implemented method of claim 1, wherein applying the planner module to interpret the user's query further comprises determining an optimized sequence for completing each of the one or more sub-tasks.

3. The computer-implemented method of claim 1, wherein applying the planner module to interpret the user's query further comprises determining one or more optimal systems for completing each of the one or more sub-tasks.

4. The computer-implemented method of claim 3, wherein determining the one or more optimal systems for completing each of the one or more sub-tasks further comprises integrating object specifications from each of the destination software applications or systems.

5. The computer-implemented method of claim 1, wherein applying the planner module to interpret the user's query further comprises generating recommendations for the planner module by analyzing one or more documents via a retrieval-augmented generation (RAG) component.

6. The computer-implemented method of claim 5, wherein the RAG component interprets and indexes one or more object specification files of the one or more of the destination software applications or systems.

7. The computer-implemented method of claim 1, wherein applying the planner module further comprises applying a large language learning model (LLM).

8. The computer-implemented method of claim 7, wherein applying the planner module to decompose the user's query further comprises integrating a LLM Plan Designer component to define one or more sub-tasks.

9. The computer-implemented method of claim 8, wherein the LLM Plan Designer component defines the one or more sub-tasks based on the recommendations provided by the RAG component.

10. The computer-implemented method of claim 2, wherein determining the optimized sequence for completing each of the one or more sub-tasks further comprises ordering each sub-task in a Planner Queue component of the planner module.

11. The computer-implemented method of claim 10, the method further comprising sending each of the one or more sub-tasks to the navigator module in order of which sub-task entered the Planner Queue component earliest.

12. The computer-implemented method of claim 1, wherein applying the navigator module to generate the tailored approach further comprises translating each of the sub-tasks generated by the planner module into one or more system-focused sub-tasks.

13. The computer-implemented method of claim 12, wherein translating each of the sub-tasks into the system-focused sub-tasks further comprises integrating task-specific objects, wherein the task-specific objects comprise one or more table schemas or one or more API request schemas.

14. The computer-implemented method of claim 1, wherein analyzing the one or more sub-tasks of the planner module further comprises analyzing one or more of: a task description, an endpoint to be invoked, an invocation type, a method of invocation, and/or an endpoint object specification.

15. The computer-implemented method of claim 1, wherein applying the navigator module to generate the tailored approach further comprises accessing the one or more destination software applications or systems using SQL, APIs, SDK, or cloud-based integration platforms, or any combination thereof.

16. The computer-implemented method of claim 1, wherein applying the navigator module to generate the tailored approach further comprises applying an LLM.

17. The computer-implemented method of claim 16, wherein identifying the one or more appropriate API's and/or generating one or more appropriate SQL codes further comprises modifying the APIs or SQL codes using the LLM.

18. The computer-implemented method of claim 1, wherein applying the navigator module to generate the tailored approach further comprises returning a preliminary output for a first sub-task, wherein the navigator module utilizes the preliminary output for the first sub-task to generate the tailored approach for one or more subsequent sub-tasks.

19. The computer-implemented method of claim 1, the method further comprising applying the navigator module to generate an expected output, wherein the expected output is provided to the executor module by the navigator module.

20. The computer-implemented method of claim 19, wherein the expected output comprises one or more parameters from a response object of the caller component output.

21. The computer-implemented method of claim 1, wherein applying the caller component of the executor module to execute the one or more sub-tasks further comprises formulating one or more optimized request bodies and/or one or more commands aligning with system specifications.

22. The computer-implemented method of claim 1, wherein applying the parser component of the executor module to execute the one or more sub-tasks further comprises receiving information from a remote system.

23. The computer-implemented method of claim 1, wherein identifying and extracting the relevant information further comprises identifying and extracting headers in AIP responses or tuples in SQL result sets.

24. The computer-implemented method of claim 23, wherein the relevant information further comprises one or more SQL response objects, or one or more API response schema.

25. The computer-implemented method of claim 1, wherein applying the response generator model to generate the one or more optimized final responses further comprises deriving the optimized response from the selected destination software applications.

26. The computer-implemented method of claim 1, wherein applying the response generator model to generate the one or more optimized final responses further comprises applying a LLM.

27. The computer-implemented method of claim 26, wherein generating one or more of the optimized final user responses via the response generator module further comprises processing the data retrieved from the executor module with the LLM to generate the optimized final user responses.

28. The computer-implemented method of claim 1, the method further comprising initiating internal verification checkpoints to verify successful execution of each sub-task.

29. The computer-implemented method of claim 28, the method further comprising collecting logs for each of the one or more sub-tasks for each of the modules.

30. The computer-implemented method of claim 28, the method further comprising outputting a notification to the user that the sub-task cannot be executed.

31. The computer-implemented method of claim 30, the method further comprising outputting a customized notification to the user comprising the name of the sub-task that cannot be executed.

32. The computer-implemented method of claim 1, the method further comprising returning the executor module results to the planner module, and the planner module modifying the one or more sub-tasks based on the returned results.

33. The computer-implemented method of claim 32, the method further comprising the planner module operating in an exhaustive modality or a clarification modality upon receiving multiple returned results from the executor module.

34. The computer-implemented method of claim 33, operating in the exhaustive modality further comprising applying the planner module to create a plan branch node for each returned result from the executor module, wherein the planner module clones each of the one or more remaining sub-tasks into each plan branch.

35. The computer-implemented method of claim 33, operating in the clarification modality further comprising applying the response module to output a clarifying query to the user, wherein upon additional clarifying user input, applying the planner module to select one of the plan branches, or eliminate one of the plan branches.

36. A computer-implemented system for optimizing the retrieval of data from multiple different destination software applications, the system comprising:

a planner module configured to interpret a user's query by performing operations comprising:

a) receiving a user query input, and b) decomposing the user query input into one or more sub-tasks, wherein each sub-task is associated with a specific system and an objective;

a navigator module configured to generate a tailored approach for executing each of the one or more sub-tasks by performing operations comprising: analyzing the one or more sub-tasks of the planner module and one or more system reference documents to identify one or more appropriate API's and/or generate one or more appropriate SQL codes;

an executor module configured to execute one or more of the sub-tasks in the destination system by performing operations comprising:

a) formulating appropriate caller parameters via a caller component, and b) identifying and extracting the relevant information via a parser component; and a response generator module configured to generate an optimized final user response, wherein the generator module generates the optimized final user response by compiling data retrieved from the executor module.

* * * * *